US012390393B2

(12) United States Patent
Palmer et al.

(10) Patent No.: US 12,390,393 B2
(45) **Date of Patent: *Aug. 19, 2025**

(54) DEVICE AND METHOD FOR ASSISTING BREATHING IN A SUBJECT

(71) Applicant: The Penn State Research Foundation, University Park, PA (US)

(72) Inventors: Charles Palmer, Hummelstown, PA (US); William J. Weiss, Mechanicsburg, PA (US)

(73) Assignee: The Penn State Research Foundation, University Park (PA)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,333

(22) Filed: Dec. 15, 2022

(65) Prior Publication Data

US 2023/0117092 A1 Apr. 20, 2023

Related U.S. Application Data

(63) Continuation of application No. 16/345,305, filed as application No. PCT/US2017/058949 on Oct. 30, 2017, now Pat. No. 11,554,076.

(Continued)

(51) Int. Cl.

*A61H 31/02* (2006.01)
*A61H 31/00* (2006.01)

(52) U.S. Cl.

CPC ....... *A61H 31/02* (2013.01); *A61H 2031/002* (2013.01); *A61H 2031/003* (2013.01);

(Continued)

(58) Field of Classification Search

CPC .............. A61H 31/02; A61H 2031/002; A61H 2031/003; A61H 2201/0192;

(Continued)

(56) References Cited

U.S. PATENT DOCUMENTS

| | | | | |
|---|---|---|---|---|
| 2,869,537 | A | 1/1959 | John | |
| 3,043,292 | A * | 7/1962 | Mendelson | A61H 31/007 601/44 |

(Continued)

FOREIGN PATENT DOCUMENTS

| | | | |
|---|---|---|---|
| DE | 2028036 | A1 | 12/1971 |
| WO | 2015100494 | A1 | 7/2015 |
| WO | 2015157154 | A1 | 10/2015 |

OTHER PUBLICATIONS

Extended European Search Report for App. No. EP17864293.0, dated May 7, 2020, 8 pages.

(Continued)

*Primary Examiner* — Justine R Yu
*Assistant Examiner* — Matthew R Moon
(74) *Attorney, Agent, or Firm* — Riverside Law LLP

(57) ABSTRACT

A distension/compression device for assisting breathing in a subject in one embodiment includes a first tube includes a flexible and elastic material that forms a first tube lumen extending from a proximal end to a distal end of the first tube. Longitudinal expansion of the first tube is restricted less than radial expansion of the first tube. A connection element including a first air supply port is in fluid communication with an open proximal end of the first tube lumen and attached to a proximal end of the first tube. A method for assisting breathing of a patient and a method for assisting the clearing of secretions is also included.

19 Claims, 23 Drawing Sheets

Related U.S. Application Data

(60) Provisional application No. 62/414,042, filed on Oct. 28, 2016.

(52) U.S. Cl.
CPC ................ *A61H 2201/0192* (2013.01); *A61H 2201/1238* (2013.01); *A61H 2201/1621* (2013.01); *A61H 2201/5058* (2013.01); *A61H 2230/045* (2013.01); *A61H 2230/085* (2013.01); *A61H 2230/405* (2013.01)

(58) Field of Classification Search
CPC .... A61H 2201/1238; A61H 2201/1621; A61H 2201/5058; A61H 2230/045; A61H 2230/085; A61H 2230/405
USPC .................................................. 601/148–152
See application file for complete search history.

(56) References Cited

U.S. PATENT DOCUMENTS

| | | | | |
|---|---|---|---|---|
| 3,961,626 | A | 6/1976 | Houchen | |
| 4,481,938 | A * | 11/1984 | Lindley | A61H 31/02 128/205.26 |
| 4,753,226 | A | 6/1988 | Zheng | |
| 4,840,167 | A | 6/1989 | Olsson | |
| 4,928,674 | A | 5/1990 | Halperin | |
| 5,490,820 | A * | 2/1996 | Schock | A61H 31/006 601/1 |
| 5,738,089 | A * | 4/1998 | Hoshi | A61H 9/0078 128/205.16 |
| 5,820,572 | A | 10/1998 | Palmer | |
| 5,938,627 | A * | 8/1999 | Hickman | A61H 9/0078 601/149 |
| 6,533,739 | B1 | 3/2003 | Palmer | |
| 6,620,116 | B2 * | 9/2003 | Lewis | A61H 9/0078 601/44 |
| 6,708,691 | B1 * | 3/2004 | Hayek | A61H 31/02 137/625.21 |
| 6,736,785 | B1 * | 5/2004 | Van Brunt | A61H 31/00 601/44 |
| 6,869,409 | B2 | 3/2005 | Rothman | |
| 7,435,233 | B2 | 10/2008 | Baldauf | |
| 7,618,383 | B2 | 11/2009 | Palmer | |
| 7,744,547 | B2 * | 6/2010 | Jiang | A61H 31/02 601/44 |
| 8,034,011 | B2 | 10/2011 | Shaffer | |
| 8,142,372 | B2 * | 3/2012 | Rastegar | A61H 9/0092 601/44 |
| 8,277,399 | B2 | 10/2012 | Hamilton | |
| 8,578,939 | B1 | 11/2013 | Kimani Mwangi | |
| 9,820,904 | B2 * | 11/2017 | Lafleche | A61H 9/0078 |
| 10,245,207 | B2 * | 4/2019 | Avni | A61H 23/0263 |
| 10,952,918 | B2 | 3/2021 | Palmer | |
| 2002/0165618 | A1 | 11/2002 | Ingenito | |
| 2005/0159690 | A1 | 7/2005 | Barak | |
| 2006/0189905 | A1 | 8/2006 | Eischen, Sr. | |
| 2006/0266369 | A1 * | 11/2006 | Atkinson | A61F 5/566 128/859 |
| 2007/0088239 | A1 | 4/2007 | Roth | |
| 2008/0000477 | A1 * | 1/2008 | Huster | A61M 11/06 601/149 |
| 2009/0012434 | A1 * | 1/2009 | Anderson | A61H 9/0057 601/6 |
| 2009/0171256 | A1 | 7/2009 | Fiorina | |
| 2009/0299308 | A1 | 12/2009 | Kazala, Jr. | |
| 2010/0004572 | A1 | 1/2010 | King | |
| 2010/0256540 | A1 | 10/2010 | Yamashiro | |
| 2010/0326442 | A1 | 12/2010 | Hamilton | |
| 2012/0071801 | A1 * | 3/2012 | Avitable | A61H 9/0092 601/151 |
| 2012/0079662 | A1 | 4/2012 | Dzioba | |
| 2014/0276271 | A1 * | 9/2014 | Stryker | A61H 23/04 601/107 |
| 2016/0271005 | A1 | 9/2016 | Morcos | |
| 2016/0324722 | A1 | 11/2016 | Sinderby | |

OTHER PUBLICATIONS

International Search Report and Written Opinion for App. No. PCT/US2017/058949, dated Jan. 8, 2018, 10 pages.
Office Action (Final Rejection) dated Jan. 19, 2022 for U.S. Appl. No. 16/345,305 (pp. 1-23).
Office Action (Notice of Allowance and Fees Due (PTOL-85)) dated Sep. 15, 2022 for U.S. Appl. No. 16/345,305 (pp. 1-12).
Office Action dated Aug. 20, 2021 for U.S. Appl. No. 16/345,305 (pp. 1-23).

* cited by examiner

| Approximate Age Range | Respiratory Rate (breaths per min) |
|---|---|
| Newborn | 30-50 |
| 0-5 months | 25-40 |
| 6-12 months | 20-30 |
| 1-3 years | 20-30 |
| 3-5 years | 20-30 |
| 6-10 years | 15-30 |
| 11-14 years | 12-20 |
| 15-20 years | 12-30 |
| Adults | 16-20 |

FIG. 8B

| Modes of device inflation/deflation | |
|---|---|
| Constant Inflation Mode (0 Hz) | Acts to provide constant distension to the chest wall |
| Ventilatory Mode (alternating inflation/deflation at 1-4 Hz) | Distends the chest wall during inspiration, relaxes during exhalation. Can be synchronized with the patient's normal ventilation, or applied as a fixed ventilatory rate in the case of apnea. |
| Oscillatory/Pulsed Mode (5-15 Hz) | High frequency oscillations promote gas mixing and the movement of fluid secretions in the chest. Can be applied alone, or in combination with the constant inflation or ventilator modes. |

FIG. 8C

| | Applied Pressure | Mannequin Volume displaced |
|---|---|---|
| Chest Expander Single inflation | 250-300mmHg | 3ml inhalation |
| | 450-500mmHg | 6.4ml inhalation |
| Chest Expander Oscillation inflation | | 0.8ml inhalation |
| Chest Expander with vacuum | Chest compression | 0.6ml exhalation |

DEVICE AND METHOD FOR ASSISTING BREATHING IN A SUBJECT

CROSS-REFERENCE TO RELATED APPLICATIONS

This application a continuation of U.S. application Ser. No. 16/345,305, filed Apr. 26, 2019, which is a national stage filing of International application No. PCT/US17/58949 filed on Oct. 30, 2017, which claims priority to U.S. provisional application No. 62/414,042 filed on Oct. 28, 2016, all of which are incorporated herein by reference in their entireties.

BACKGROUND OF THE INVENTION

Newborn babies, especially those born prematurely, can experience a range of breathing issues immediately after being born. Premature infants with respiratory distress have stiff lungs and a compliant chest wall. The soft rib cage and compliant chest wall in neonates can result in the chest wall readily collapsing during spontaneous respiration. Further, neonates often have to do extra work in breathing to overcome the chest wall retraction, and the lack of chest wall rigidity allows the lung to collapse. A collapsed lung is more difficult for the neonate to inflate. Therefore, premature infants often require assistance to maintain adequate lung volumes. This is achieved by providing mechanical ventilation or continuous distending pressure.

A number of methods and devices for assisting neonatal breathing are known in the art. For example, continuous positive airway pressure (CPAP) can be an effective method for assisting breathing, preventing chest wall collapse, and providing distending pressure. However, CPAP can have major side-effects, such as airway drying and obstruction of nasal passages, and the erosion of the nasal septum from pressure necrosis. Even when positive distending pressure is applied non-invasively, i.e., without endotracheal intubation, it fails to support spontaneous respiration in 30-50% of preterm infants with respiratory distress. These infants are then intubated, given surfactant and mechanically ventilated. Mechanical ventilation via an endotracheal tube is associated with injury to the lung and chronic lung disease. Further, chronic lung disease is associated with neurodevelopmental impairment. Accordingly, clinicians caring for preterm infants with respiratory distress prefer to support spontaneous respiration without the need for intubation and mechanical ventilation. In addition, the cost of surfactant is prohibitive in some countries. Therefore, non-invasive ventilation of a neonate, for example the application of negative distending pressure, is preferred over intubation and positive pressure ventilation.

Methods and devices for applying negative distending pressure known in the art include the neonatal chest brace described by Palmer et al. (U.S. Pat. No. 6,533,739). While the chest brace in Palmer represents a notable advancement in the field, it is not suitable for certain applications, because it requires a rigid brace that can interfere with the delicate condition of most neonates, especially those born prematurely. Specifically, in certain applications the rigid brace is not sufficiently flexible for applying delicate adjustments to the negative distending pressure in a neonate. The infants that fail non-invasive ventilation with CPAP are typically the smallest and most immature, for example those weighing less than 1000 grams. The chest brace in Palmer is not suitable for these infants, who require a more delicate means of negative distension. The chest brace is also mechanically complicated and is not easily applied. Further, the chest brace does not permit active ventilation of the neonate and it does not permit oscillation of the chest wall.

In addition, the surface of the chest on a newborn can be very contoured as the ribcage buckles inward and the infant struggles to breathe. Thus, conventional devices that are rigid or otherwise utilize planar surfaces are at a disadvantages, since the rigid or planar surfaces will not easily mate with the contoured surface of the infant's chest. Thus, if the device can only contact the patient at a limited number of points, the forces at those limited number of points will experience higher stress versus a device that can contact the body over a larger surface area. Still further, newborns are born of different shapes and sizes, and it would be beneficial to have a device that is easily adaptable to fit the shape and size of the patient.

In addition to pulmonary insufficiency in newborns, there are other conditions in children and adults that could benefit from an improved device for assisting the patient's breathing. For example, infants in the first year of life have chest wall retractions when they present with a viral chest infection like bronchiolitis. In another example, in an acute respiratory failure or CPR scenario, emergency medical professionals could benefit from an improved device that is easy to position on the patient and immediately assists with the patient's breathing. Other medical circumstances or conditions that could benefit from an improved device include any condition causing muscle weakness, post-surgery anesthesia recovery, asthma, opioid overdose (or any condition with respiratory depression) and cardiac failure.

Thus, what is needed in the art is a minimally or non-invasive device for respiratory support. The device should maximize surface area contact, include the front and sides of the chest wall, and should be easily adaptable to patients having a variety of body surface contours, shapes and sizes. Further, the device should be adaptable for children and adults that require or could benefit from mechanically assisted breathing.

SUMMARY OF THE INVENTION

In one embodiment, a device for assisting breathing in a subject includes a first tube having a flexible and elastic material that forms a first tube lumen extending from a proximal end to a distal end of the first tube, where longitudinal expansion of the first tube is restricted less than radial expansion of the first tube, and a connection element including an air supply port in fluid communication with an open proximal end of the first tube lumen and attached to a proximal end of the first tube. In one embodiment, the device includes a second tube comprising a flexible and elastic material that forms a second tube lumen, wherein the second tube lumen extends from an open proximal end to a closed distal end of the second tube, and wherein longitudinal expansion of the second tube is restricted less than radial expansion of the second tube; wherein the connection element comprises a second air supply port in fluid communication with an open proximal end of the second tube lumen and attached to a proximal end of the second tube. In one embodiment, the first air supply port is in fluid communication with the second air supply port through a branched connection off a primary air conduit. In one embodiment, the device includes a third tube comprising a flexible and elastic material that forms a third tube lumen, wherein the third tube lumen extends from an open proximal end to a closed distal end of the third tube, and wherein longitudinal expansion of the third tube is restricted less than radial expansion of the third tube; wherein the connection element comprises a third air supply port in fluid communication with an open proximal end of the third tube lumen and attached to a proximal end of the third tube. In one embodiment, the first air supply port is in fluid communication with the second and third air supply port through a branched connection off a primary air conduit. In one embodiment, the first tube is one of a plurality of tubes comprising a flexible and elastic material, and wherein the plurality of tubes are embedded in a flexible and elastic layer. In one embodiment, at least one sensor is at least partially embedded in the flexible and elastic layer. In one embodiment, the sensor is configured to detect a signal indicative of at least one of heart rate, respiratory effort, chest displacement and tube function. In one embodiment, the first tube is at least partially embedded in silicone foam. In one embodiment, the first tube is at least partially embedded in silicone. In one embodiment, a medical-grade skin adhesive is disposed directly on the silicone. In one embodiment, a surface of the silicone is plasma treated where the medical-grade skin adhesive is disposed. In one embodiment, the adhesive is a silicone adhesive. In one embodiment, radial expansion of the first tube is completely restricted. In one embodiment, longitudinal expansion of the first tube is substantially free from restriction. In one embodiment, longitudinal expansion of the first tube is variably restricted. In one embodiment, restriction of radial expansion of the first tube is provided at least partially by one or more restrictive fibers or wires connected to the flexible and elastic material. In one embodiment, the distal end of the first tube lumen is closed. In one embodiment, the distal end of the first tube lumen is open, and device includes a second connection element including a second air supply port in fluid communication with the open distal end of the first tube lumen and attached to the distal end of the first tube. In one embodiment, the device includes a second tube comprising a flexible and elastic material that forms a second tube lumen, wherein the second tube lumen extends from an open proximal end to a closed distal end of the second tube, and wherein longitudinal expansion of the second tube is restricted less than radial expansion of the second tube, where the connection element comprises a branch connected to the air supply port in fluid communication with the proximal end of the second tube lumen and attached to a proximal end of the second tube. In one embodiment, the device includes a third tube comprising a flexible and elastic material that forms a third tube lumen, wherein the third tube lumen extends from an open proximal end to a closed distal end of the third tube, and wherein longitudinal expansion of the third tube is restricted less than radial expansion of the third tube, where the connection element comprises a branch connected to the air supply port in fluid communication with the proximal end of the third tube lumen and attached to a proximal end of the third tube. In one embodiment, at least one of the longitudinal restrictions of the first tube is different than at least one of the longitudinal restrictions of the second tube. In one embodiment, the device includes a controller operably connected to the first distension device, where the controller is configured to drive a signal to an air pump for generating a pressure within the first tube. In another embodiment more than three tubes can be placed side by side and connected to the air source to provide a wider surface area of attachment to the chest wall. In another embodiment the tubes are imbedded in silicone. In such an embodiment the surface of the silicone is soft and pliable and allows the attachment to the skin with an adhesive. In one embodiment, the signal is based at least partially on sensor feedback. In one embodiment, the device includes a first and second distension device, where the first distension device is designated for attachment to the chest of the subject, and wherein the second distension device is designated for attachment to the abdomen of the subject. In another embodiment the tube assembly covers the ribcage and abdomen. In one embodiment, the device includes a controller operably connected to the first and second distension device. In one embodiment, the controller is configured to independently drive the expansion of the first and second distension devices. In one embodiment, the controller is configured to oscillate inflation of one distension device while providing a constant inflation to the other distension device. In one embodiment, the controller is configured to oscillate inflation of one distension device and oscillate inflation of the other distension device, and wherein the oscillations are centered around a different average pressure. In one embodiment, the controller is configured to oscillate inflation of one distension device and oscillate inflation of the other distension device, and wherein the oscillations are out of sync. In one embodiment, the device includes at least one sensor, and the controller is configured to change operation of the first and second distension devices based on feedback detected from the at least one sensor. In one embodiment, the change in operation is at least one of synchronization, displacement, oscillation, static pressure or an on/off operational state. In on embodiment the device can apply a constrictive force to the chest for varying time intervals including oscillation. To produce a compressive force to the chest the device needs to be sufficiently elastic to allow an applied vacuum to shrink the device. In one embodiment, the device includes an adhesive for attaching the first tube to a surface of the subject. In one embodiment, the adhesive is an elongate strip. In one embodiment, the device includes an attachment mechanism for attaching the first tube to the subject's skin, and a means for anchoring a proximal and distal anchor to the subject's skin. In one embodiment, the attachment mechanism comprises a hook and loop fastener. In one embodiment, at least a portion of the hook and loop fastener provides restriction of radial expansion of the first tube. In one embodiment, the attachment mechanism includes a skin protective layer including at least one of a hydrogel, silicone a hydrocolloid dressing or a semipermeable membrane. In another embodiment an elastic adhesive is the method of attachment with the elastic adhesive applied to the surface of the tubes in contact with the skin. In one embodiment, the first tube lumen is inflated by transferring air to the lumen via a syringe or a bulb syringe. In one embodiment, the first tube lumen is inflated by transferring air to the lumen via a ventilator or an air pump. In one embodiment, at least a portion of a surface of the first tube comprises a soft fabric. In one embodiment, the subject is a neonate. In one embodiment, a respirator includes the distension device.

In one embodiment, a method for assisting breathing in a subject includes the steps of attaching a first flexible and elastic tube having a first lumen to the chest or abdomen of a subject, anchoring a proximal and distal end of the at least first tube to a first and second posterolateral or posterior region of the subject, inflating the at least first tube by transferring air into first lumen, and applying a negative distending pressure to the subject's chest or abdomen via the inflating. In one embodiment, the method includes the step of at least partially deflating the at least first tube to reduce the negative distending pressure applied to the subject's chest or abdomen. In one embodiment, the method includes the step of attaching the at least first tube to the subject's chest or abdomen by a skin attachment mechanism. In one embodiment, the skin attachment mechanism is a hydrogel. In one embodiment, the skin attachment mechanism is a hydrocolloid. In one embodiment, the skin attachment mechanism is a semi-permeable membrane dressing. In one embodiment the attachment mechanism is a silicone adhesive. In one embodiment, the at least first tube is in continuous contact with the subject's chest or abdomen. In one embodiment, the method includes the step of transferring air into the first lumen via a syringe or a bulb syringe. In one embodiment, the method includes the step of transferring air into the first lumen via a ventilator or an air pump. In one embodiment, the method includes the step of transferring a predetermined amount of air into the first lumen to inflate the at least one first tube. In one embodiment, the predetermined amount of air corresponds to an application of negative distending pressure to the subject's chest or abdomen that causes the subject to inhale a breath approximately equal to or less than the tidal volume. In one embodiment, the inflation of the at least one tube is synchronized with the spontaneous inspiration of the subject. In one embodiment, the negative distending pressure applied to the subject's chest or abdomen is statically maintained for a predetermined period of time. In one embodiment, the method includes the step of deflating the at least one tube to release the negative distending pressure. In one embodiment, a vacuum pressure is applied to the tube. In one embodiment, a vacuum pressure applied to the tube generates a constrictive force on the chest wall, applying a positive pressure to the chest to facilitate the elimination of secretions in the lung. In one embodiment, the inflating or deflating of the at least one tube is controlled based on sensor feedback of the subject's diaphragm. In one embodiment, the operation of the at least one tube is based on sensor feedback. In one embodiment, the step of applying a negative distending pressure comprises high frequency oscillations. In another embodiment the step of applying a positive compressive pressure comprises high frequency oscillations. In one embodiment, the first flexible tube is one of a plurality of flexible tubes embedded in silicone. In one embodiment, the method includes the steps of applying a vacuum pressure to the first lumen. In one embodiment, the method includes the steps of generating a constrictive force on the chest wall, and applying a positive pressure to the chest to facilitate the elimination of secretions in the lung.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 8B is a table of respiratory rate ranges for various ages according to one embodiment, and FIG. 8C is a chart showing exemplary modes of device inflation/deflation according to one embodiment.

DETAILED DESCRIPTION OF THE INVENTION

Figure 1A:
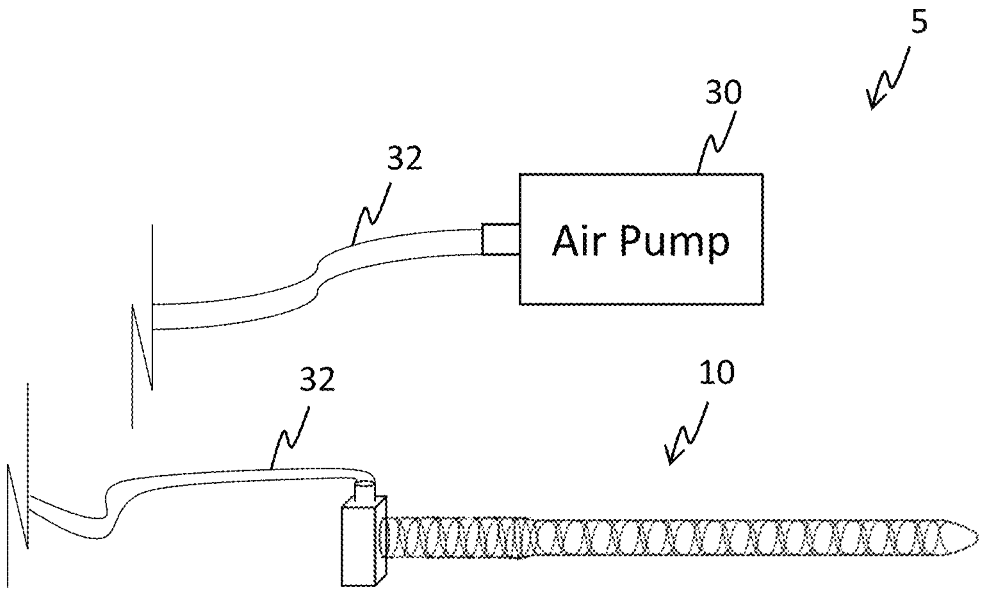
FIG. 1A is a side view of a distension system according to one embodiment.

It is to be understood that the figures and descriptions of the present invention have been simplified to illustrate elements that are relevant for a more clear comprehension of the present invention, while eliminating, for the purpose of clarity, many other elements found in systems and methods for assisted breathing. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a distension device, system and method.

Embodiments described herein include a distension device that can attach to a patient's chest or abdomen to lift it outwards by way of one or more inflatable tubes that expand longitudinally more than they do radially, and in certain embodiments while maintaining a substantially constant diameter. Advantageously, the devices contact a large surface area of the patient's chest and can also fit the various contours of patients that are encountered in practice, providing a stable and evenly distributed negative distending pressure to the patient. As a result, the devices described herein pull outwards on a larger surface area with less concentrated stresses, leading to greater tidal volumes in a patient's lungs. By implementing inflatable tubes that lengthen with little to no change in diameter, the external ventilator devices also avoid the application of damaging compressive forces on the patient when inflated. In certain embodiments, a compressive force is applied to the patient's chest to encourage a forced expiration (such as a cough) by creating a vacuum or negative pressure in the tubes, thereby shrinking them against the sides of the chest. Accordingly the device can act as a chest expander and compressor by increasing the intraluminal pressure applied to the tubes (acting as a chest expander, applying a negative distending pressure) or decreasing the intraluminal pressure applied to the tubes (facilitates chest compression, applies a positive compressive force). Table 1 illustrates these two modes according to one embodiment.

TABLE 1

| Intraluminal Tube Pressure | Intrathoracic (Intrapleural) Pressure Direction | Patient Respiratory Effect |
|---|---|---|
| Positive | Negative | Inhalation |
| Negative | Positive | Exhalation |

Figure 1B:
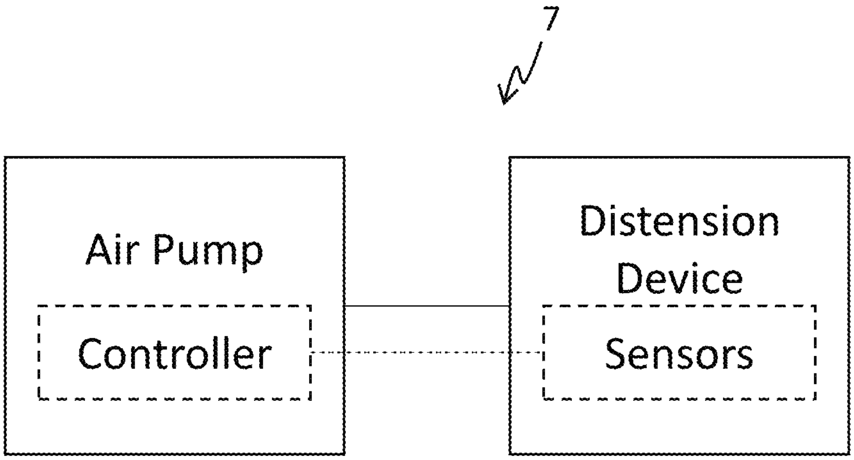
FIG. 1B is a distension system diagram according to one embodiment.

Additionally, a constant positive intraluminal tube pressure can be used to apply a static pressure, such as a static negative distending pressure to the subject's chest or abdomen for a predetermined period of time With reference now to FIGS. 1A and 1B, according to one embodiment, a distension system 5 includes a distension device 10 that is connected to an air pump 30 by flexible connection tubing 32. The air pump 30 can be controlled by a controller that's connected to or integrated with the pump 30. The pump drives air to a lumen of the distension device 10, generating a positive intraluminal pressure and causing the distension device 10 to expand longitudinally, as will be explained in further detail below. The controller can be connected wirelessly to a device controlled by the subject and/or a medical professional for reviewing pump performance, observing sensor data from sensors integrated into the distension device, or changing setting or operating modes of the distension device. The sensors can be connected to a controller via a hardwired or wireless connection. In certain embodiments, the sensors can provide feedback to the controller regarding for instance the movement of the patient's diaphragm. The sensor feedback loop can automatically change the operating parameters of the pump, for instance, changing the amplitude or intensity of an oscillating mode, or changing from an oscillating mode to a static mode. Sensors may include for example EKG or RIP (respiratory inductance plethysmography) sensors. Sensors can be used to measure physiological parameters from the patient, and/or functional parameters of the device.

In one embodiment, the air pump 30 is portable and battery powered. In one embodiment, the pump is a self-contained compressor or a blower type pump. The subject may in certain embodiments wear the pump on a belt for added portability. In certain embodiments, the pump is a hand operated or foot operated pump. In certain embodiments, the pump supplies air to more than one distension device or more than one tube on a distension device. The pump also has functionality in some embodiments to generate and maintain a constant positive or negative pressure, using for example a system of valves. In certain embodiments, the pump oscillates between two different positive pressures, or between a positive and a negative pressure. A valve (such as a venturi valve) can be utilized to open and close for generating negative or positive pressures, or for oscillating between positive and negative pressures. For oscillation modes, the pump can provide high frequency increases in pressure of variable amplitude when required. Embodiments of static and oscillating pump modes are provided in further detail below. As would be understood by those having ordinary skill in the art, various types of pumps and pressuring media can be used to pressurize the tubes. For example, gas (e.g. Co2, helium) or liquid (water) can be used as the pressurizing fluid. Further, the media can be heated or cooled as needed for optimizing function of the tubes and providing a therapeutic effect to the patient.

Figure 2A:
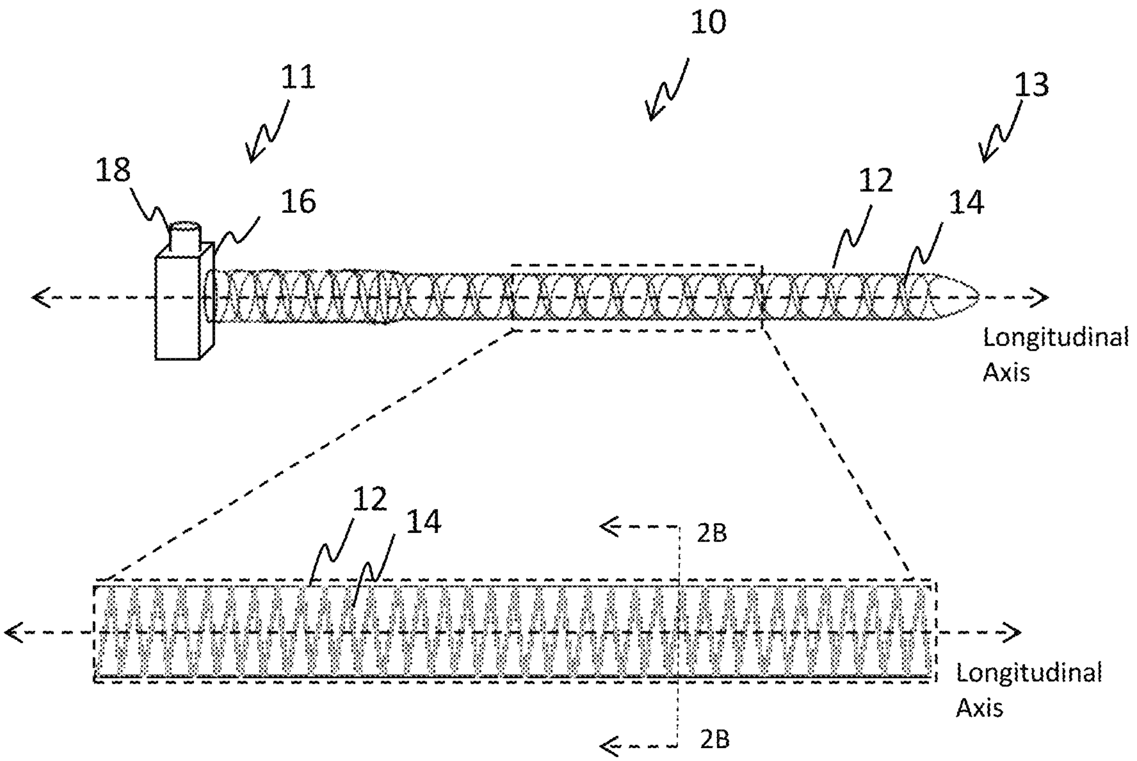
FIG. 2A is a side view of a distension device having radially restricting fibers (including a magnified view of the tube) according to one embodiment.
Figure 2B:
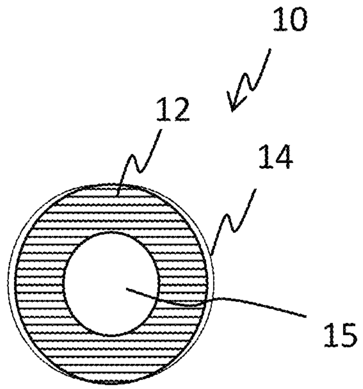
FIG. 2B is a cross-sectional view of the tube according to one embodiment.
Figure 2C:
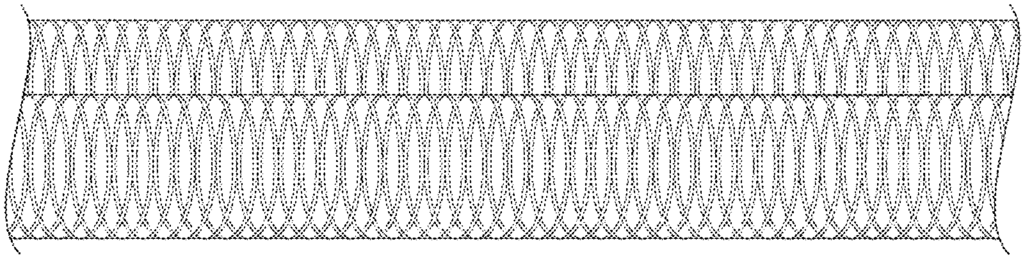
FIG. 2C is an image of a tube portion having helical restricting fibers.
Figure 2D:
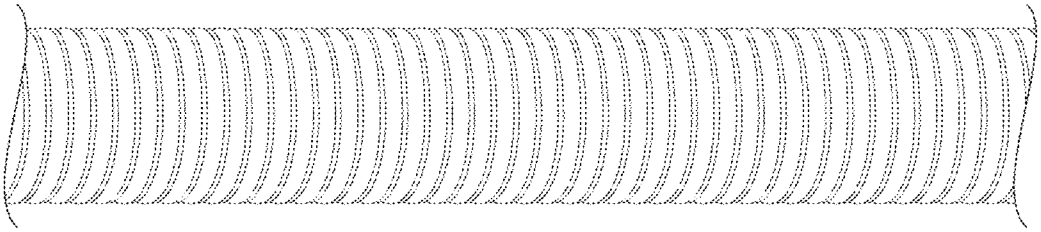
FIG. 2D is an image of a tube portion having convolutions incorporated into the tube wall.

With reference now to FIGS. 2A and 2B, according to one embodiment, a distention device 10 is shown having an elongate flexible and elastic tube 12 extending along a longitudinal axis. The tube 12 has a number of restricting fibers or wires 14 wrapped around it in a pattern that prevents radial expansion. In one embodiment, wrapping the fiber reinforcements 14 in a symmetrical double-helix configuration prevents the tube 12 from expanding radially, so that it can only expand axially. Many configurations such as a single or double helix can be used to prevent or minimize radial expansion. In one embodiment, an additional layer of material is added to one side of the tube to bias the movement of the tube outwards and away from the patient's body during inflation. The fibers 14 can wrap around the tube 12 at an angle substantially perpendicular to the longitudinal axis in certain embodiments. The fibers 14 can be situated on the outside of the tube 12, within the tube wall 12, or along the inner wall of the tube 12. The fibers can be arranged for example in a helix (e.g. FIG. 2C), double helix (e.g. FIG. 2A), rings or a combination thereof. The angle and/or density of the helical turns around the tube can vary as desired to provide variable stretching characteristics along the length of the tube. In certain embodiment, variable stretching characteristics are achieved by varying the thickness of material, or otherwise varying the material geometry or chemistry. Shape memory material can also be used in the tubing material. For instance, shape memory materials can be used to ensure that the tube maintains a convex curvature and does not form a concave curvature that could otherwise push it into the chest instead of away from it upon expansion. Shape memory materials can also be used to ensure that the tube returns to the same shape and length when it returns to a relaxed state from the expanded state. In certain embodiments, instead of fibers, reinforcement can come from rigid or semi-rigid materials formed into a helical or ring pattern. In certain embodiments, elongation can be achieved by stretching of the tube material, or alternatively by forming convolutions in the tube wall (see e.g. FIG. 2D), such as those found in corrugated tubing.

In one embodiment, the distal end 13 of the tube 12 is closed, so that as air fills the lumen 15 of the tube 12, the pressure within the lumen 15 can expand the tube 12 longitudinally. The proximal end 13 of the tube 12 is open to the air supply port 18 which extends through the connection element 16 and is in fluid communication with the lumen 15. Non-limiting examples of elastic materials that can be included in the construction of the flexible and elastic tube include silicone, vinyl, neoprene, polyvinyl urethane (PVC), urethane, and the like. In certain embodiments, the connection element is made from silicone. In one exemplary embodiment, the tube 12 has a length of approximately 17 cm elongated by approximately 3.5 mm (2%) at a pressure of 400 mmHg without a substantial change in diameter. In another embodiment, the distal end of the lumen is open to a second air supply port that extends through a second connection element. Thus, certain embodiments of the invention can have multiple air supply ports, such as a first proximal port and a second distal port. One or both of the ports can extend through the connection element.

Figure 3:
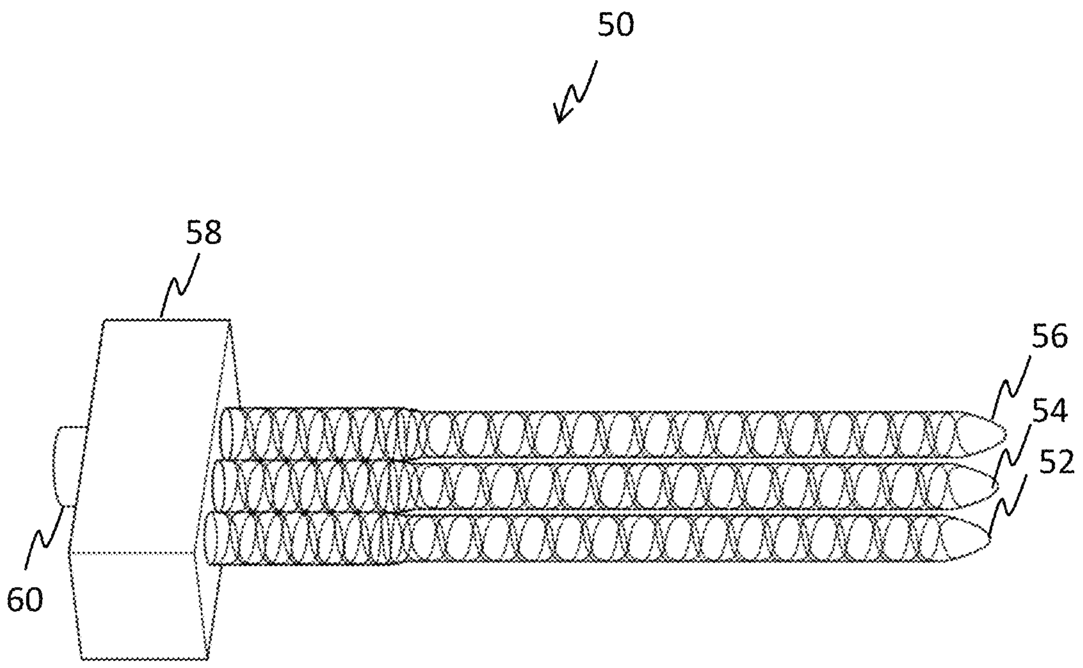
FIG. 3 is a side view of a distension device having three tubes according to one embodiment.

With reference now to FIG. 3, in one embodiment, the distending device has three tubes 52, 54, 56. The connection element 58 has an air supply port 60 that branches to lumens of each of the three tubes 52, 54, 56. One advantage to this embodiment is that the additional tubes increase surface area contact with the skin. Lifting the chest or abdomen across a larger surface area decreases spot stresses that can occur with conventional systems that only contact the skin at a limited number of points. Patients that are taller or otherwise have an elongated midsection can also benefit from embodiments featuring additional tubes. Embodiments can include 2, 3, 4, 5, 6, 7 or more tubes. In certain embodiments, two or more tubes have independent air supply ports extending through the connection element, and their air supply is independently controlled.

Figure 4A:
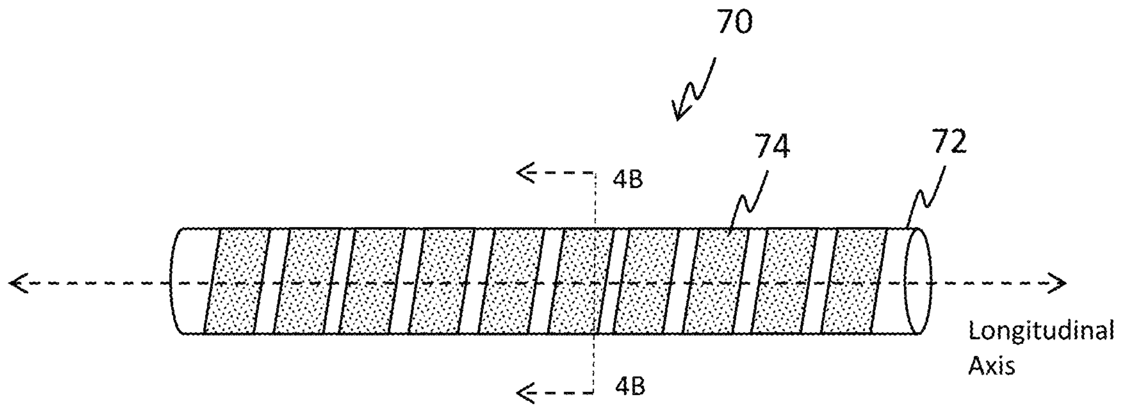
FIG. 4A is a side view of a distension device tube wrapped with a fastening element.
Figure 4B:
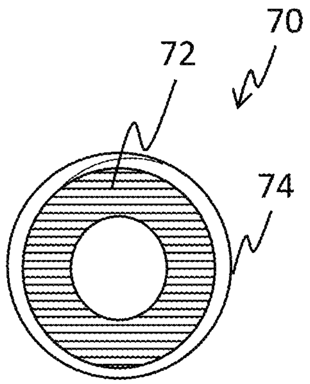
FIG. 4B is a cross-sectional view of the tube and fastening element according to one embodiment.

The flexible and elastic tubing can be restricted in radial expansion using various techniques as will be apparent to those having ordinary skill in the art. As described above, reinforcing fibers can be used to restrict radial expansion and allow longitudinal expansion. In another technique, the fastening element used to attach the tube to the skin is applied to the tube such that it restricts radial expansion and allows longitudinal expansion. With reference to FIGS. 4A and 4B, in one embodiment, a distention device 70 has a flexible and elastic tube 72 that is restricted from expansion in the radial direction by a mating fastener 74, such as a hook and loop fastener. Thus, in this example, the fastener 74 could be the loop side of the hook and loop fastener, while the hook side of the fastener is attached to the patient. Various types of flexible mating fasteners known in the art can be adapted for this type of embodiment. In certain embodiments, longitudinal expansion is made variable, such as more expansion towards the center to lift the sternum up and less expansion on the sides so that the chest is not pulled as far out sideways. Variable expansion can be manipulated for example by varying the amount or pattern of fiber reinforcements, or for example by manufacturing a tubing with variable elasticity along its length.

Figure 5A:
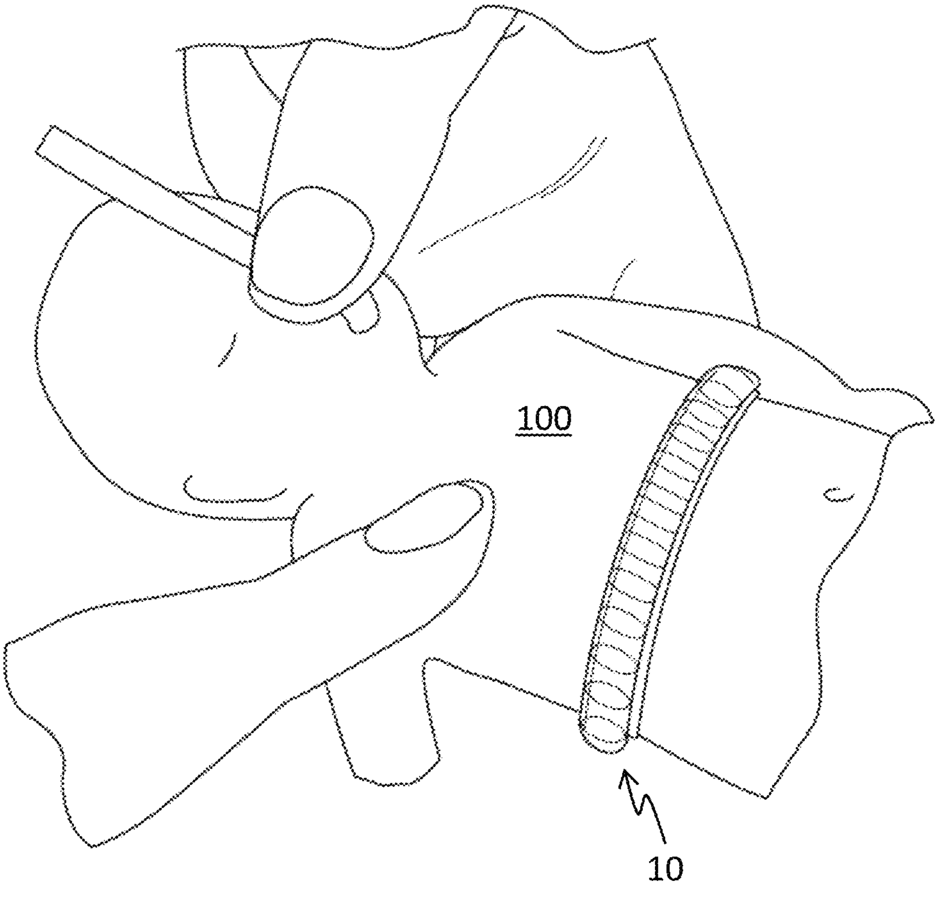
FIG. 5A is a perspective view of a single tube distension device on an infant according to one embodiment.
Figure 5B:
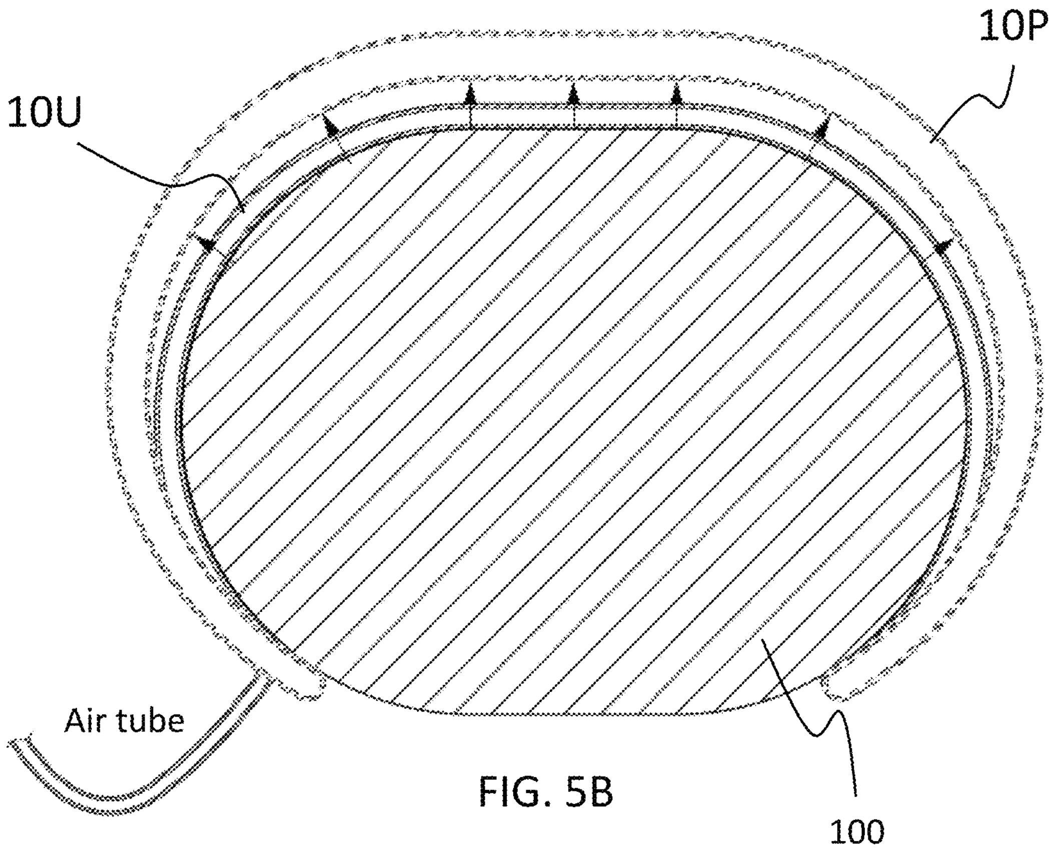
FIG. 5B is a diagram of an unpressurized tube and a pressured tube on the body according to one embodiment.

With reference now to FIGS. 5A and 5B, an exemplary embodiment of a distension device 10 is depicted as being placed around the chest of an infant 100. When the device 10U is unpressurized as shown in FIG. 5B, it attaches to and follows the contours of the body (e.g. a collapsed chest). Pressurizing the tube 10P causes it to elongate longitudinally and naturally it raises up and outwards, distending the chest wall thereby applying a negative distending pressure to the chest. Generally, the primary mode of operation of the distension device is to pull outward on the chest wall as the tube tries to longitudinally expand its volume when pressurized. This in turn causes distension of the chest wall and an increase the volume of the chest, and thereby, the lungs. In certain embodiments, the force acts outward if the relaxed curvature of the chest is convex. In certain embodiments, if the chest has a concavity, a plate, filler or other similar type support can be adhered across the concavity so that the tube remains convex in the unpressurized or relaxed position. In certain embodiments a vacuum pressure can be applied to the tubes which will then compress the chest wall creating a forced exhalation.

Figure 5C:
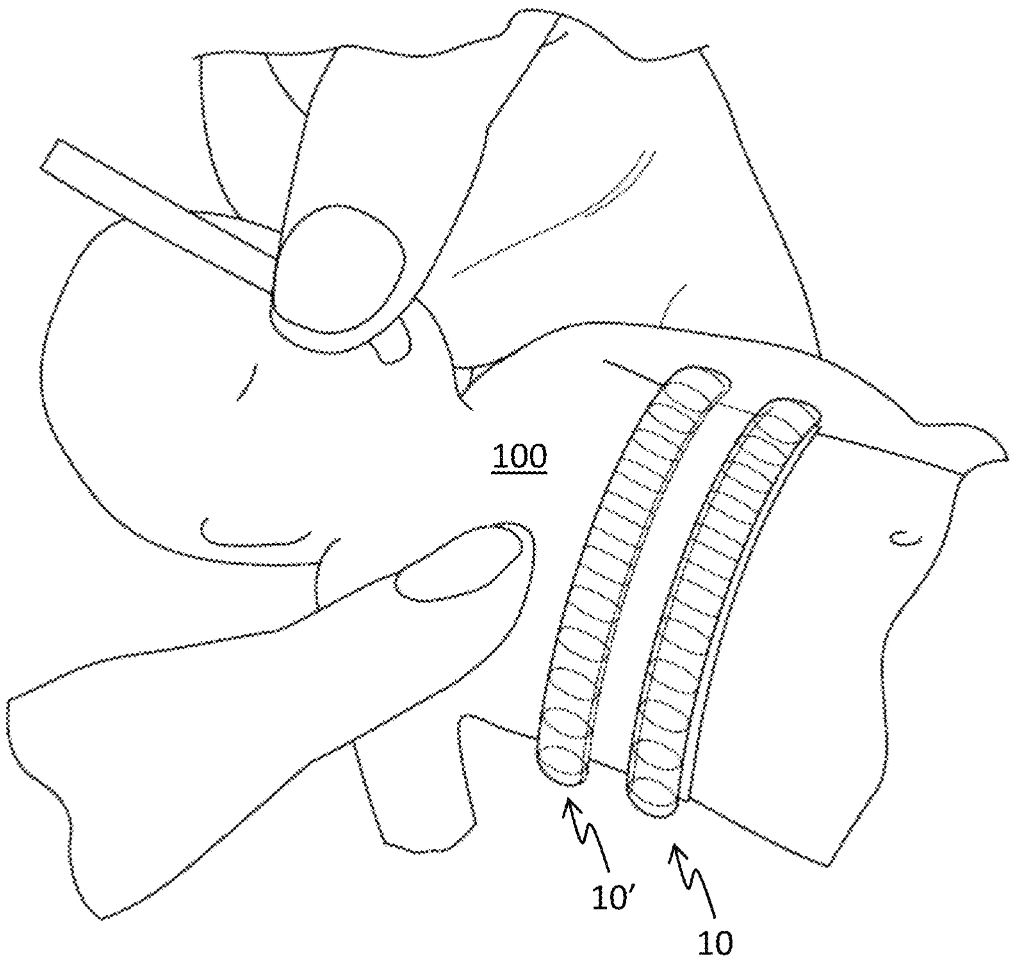
FIG. 5C is a perspective view of a two-tube distension device system on an infant according to one embodiment.

More than one distension device 10, 10' can be included in a system that controls multiple distension devices, as shown for example in FIG. 5C. Systems that control multiple distension devices can be controlled by a controller operably connected to the first and second distension device. In one embodiment, the controller is configured to independently drive the expansion of the first and second distension devices. In one embodiment, the controller is configured to oscillate inflation of one distension device while providing a constant inflation to the other distension device. In one embodiment, the controller is configured to oscillate inflation of one distension device and oscillate inflation of the other distension device. The oscillations can be centered around different average pressures. In one embodiment, the oscillations are out of sync such that one distension device pulls out from the body while the other device either moves back towards the body or remains statically pulled away from the body.

Figure 5D:
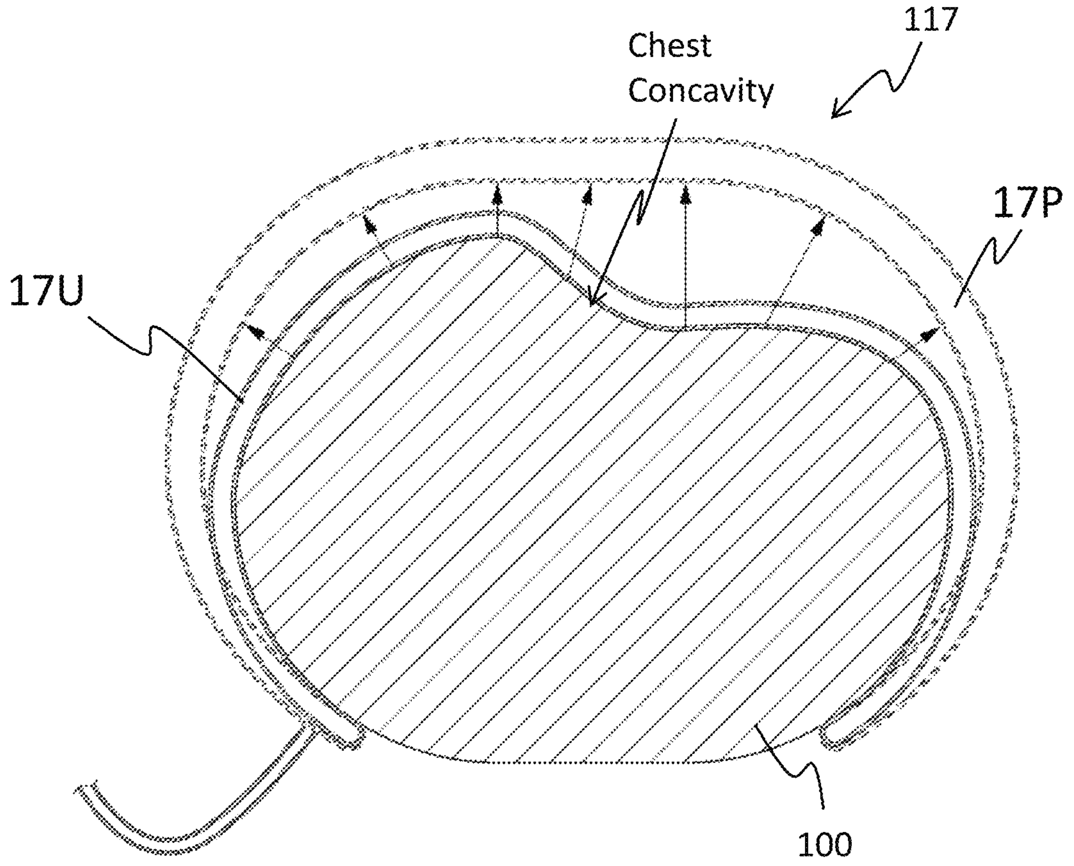
FIG. 5D is a diagram of an unpressurized tube and a pressured tube on a body having a concave chest according to one embodiment.
Figure 5E:
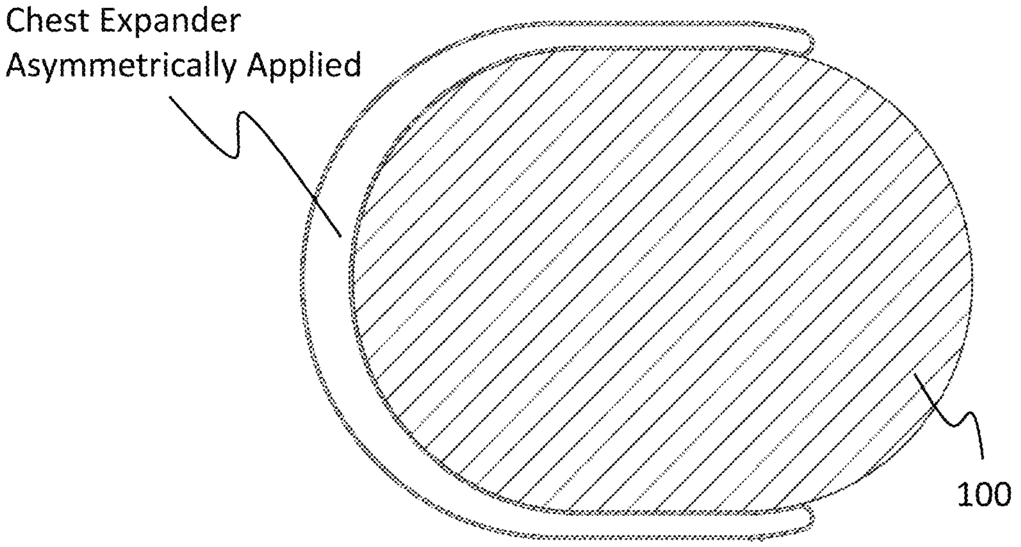
FIG. 5E is a diagram of a chest expander asymmetrically applied according to one embodiment.

With reference now to FIG. 5D, the distension device 117 is depicted as being placed around the chest of an infant having a chest concavity. When the device 117 is unpressurized 17U, it attaches to and follows the contours of the body (e.g. a collapsed chest having a chest concavity). A filler material (e.g. foam or padding) may be applied in the concavity and adhered to the skin and chest expander to maintain the chest expander in a convex shape. Pressurizing the tube 117, 17P causes it to elongate longitudinally and naturally it raises up and outwards, distending the chest wall thereby applying a negative distending pressure to the chest. The tube can have variable or customized properties for patients with a concavity so that the tube when extended moves the chest in the correct direction for applying a negative distending pressure. With reference to FIG. 5E, the length of the tube can vary to selectively direct the area of the chest wall the practitioner wants to treat. In one embodiment, the tube is shortened, or only a portion of the tube is applied to the body in an asymmetric fashion. In one embodiment, the tube is connected to only one side of the chest. In one embodiment, a property of the tube such as elasticity is varied or restrained along a specific portion of the tube to provide a specific asymmetrical and targeted distension and/or compression. In one embodiment, the tube is connected to both sides of the chest, each covering only half the circumference of the chest. For example, if the patient has a fractured rib on one side, the practitioner could apply a device with shorter tubes that served to provide external stabilization of the ribcage to a more focal area, and each side could operate separately. Stabilization would reduce pain and help healing while allowing the chest wall to function better. In one embodiment, ends of the tubes can be fixed to the skin over the sternum and over the midline of the back (see e.g. FIG. 5E). In one embodiment, the adhesive can be applied evenly to the under surface of the tubes, or unevenly so as to allow the skin the breathe and release humidity (sweat) as needed. The introduction of gaps or spaces between applications of adhesive will promote breathing of the skin.

Figure 6A:
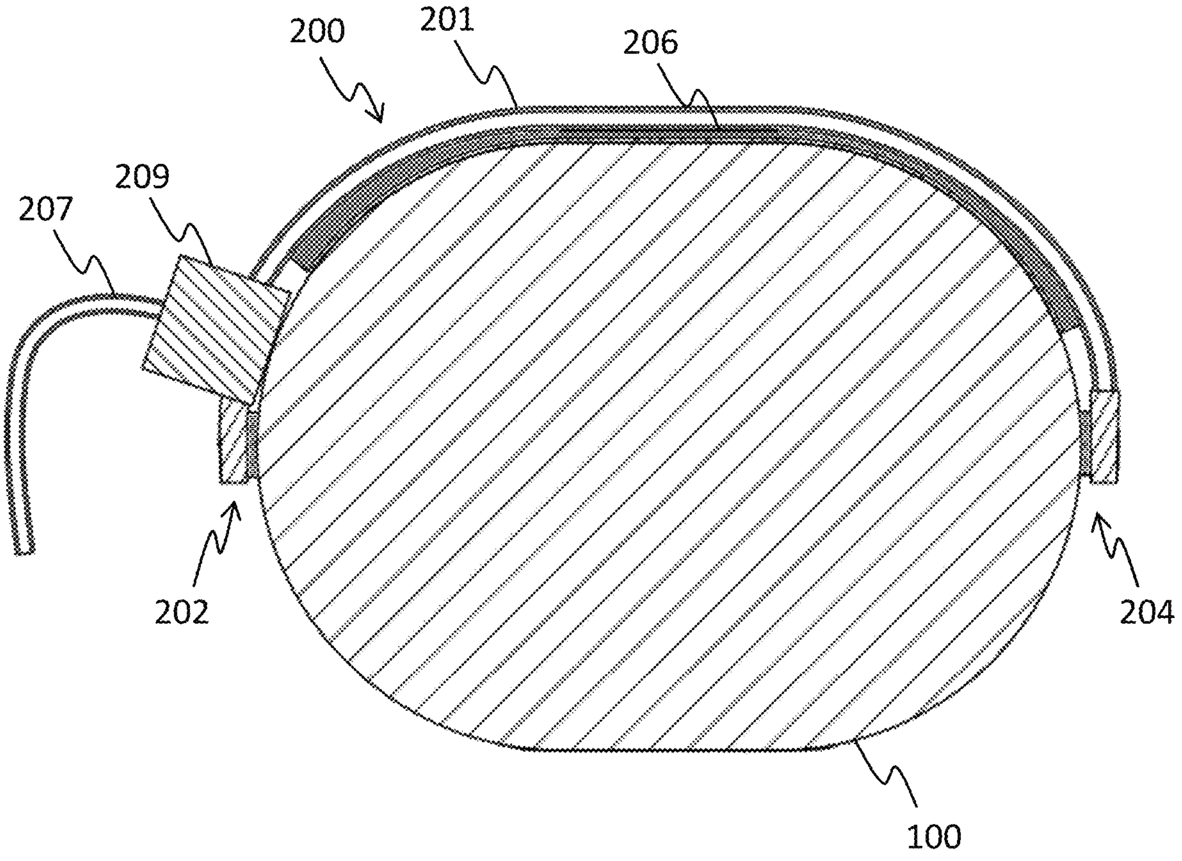
FIG. 6A is a cross-sectional view of a distension device attached to a subject according to one embodiment.

Various means for securing the distension device to the patient are depicted in FIGS. 6A-6D. FIG. 6A depicts an exemplary distension device 200 anchored to a first 202 and second 204 posterolateral or posterior region of the patient. The tube 201 is connected to a connection element 209 housing a port that communicates air between the air supply 207 and the tube 201. The tube 201 is adhered to the patient by a skin fastening element 206 such as an adhesive. In one embodiment, the device includes an adhesive for attaching the first tube to a surface of the subject. In one embodiment, the adhesive in an elongate strip than maintains continuous contact with the skin along the length of the strip. In some embodiments, the adhesive 206 can include a silicone adhesive such as SILBIONE Silicone RT Gel 4317 or similar Silicone Gels of varying adhesive quality, hydrogel or a hydrocolloid dressing, such as DUODERM, COMFEEL, or COLOPLAST hydrocolloid pectin compounds, which can be removed with water without epidermal stripping. In another embodiment, the skin fastening element can include a semi-permeable membrane dressing, for example a thin layer of TEGADERM medical dressing. In another embodiment the skin fastening element can be any adhesive or other type of compound suitable for contacting a patient's skin and also suitable for bonding fastening strip to the patient's skin.

In one embodiment, the skin fastening element can be a patch that can protect the patient's skin and provide a surface for adhering the tube or tube assembly. In one embodiment, the skin fastening element can include a release liner layer, a hydrogel layer, or some other type of skin protective layer, and an outer layer for adhering the tube. In such an embodiment, the release liner layer can be removed to expose the silicone or hydrogel layer for attachment to the patient's skin. Further, in such an embodiment, the outer layer can comprise a suitable material, such as polyurethane, that includes VELCRO hook attachment portions for attaching a matching VELCRO loop portion that is part of, or otherwise attached to, the tube. Preferably, the adhesive is applied in a pattern that enables deformation compatible with linear expansion of the tube, such as a zig-zag pattern. In certain embodiments, the adhesives are constructed in a pattern that does not enable deformation. In certain embodiments, the adhesive on the posterolateral aspect of the chest does not allow stretching but the adhesive (e.g. Velcro) on the front and antero lateral aspect of the chest allow stretching by being cut in a zig zag fashion.

Figure 6B:
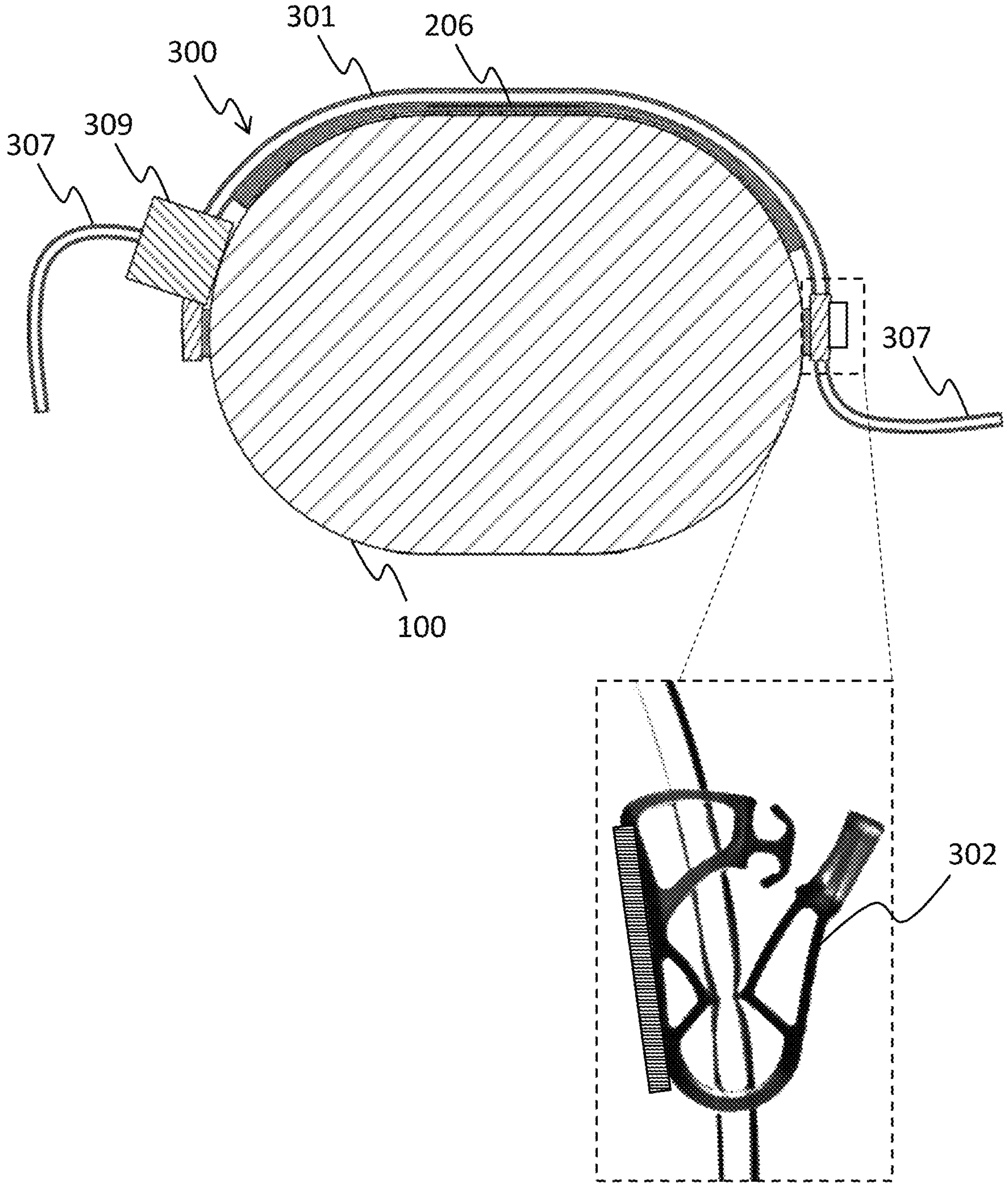
FIG. 6B is a cross-sectional view of a distension device having a length adjustment clamp attached to a subject according to one embodiment.
Figure 6C:
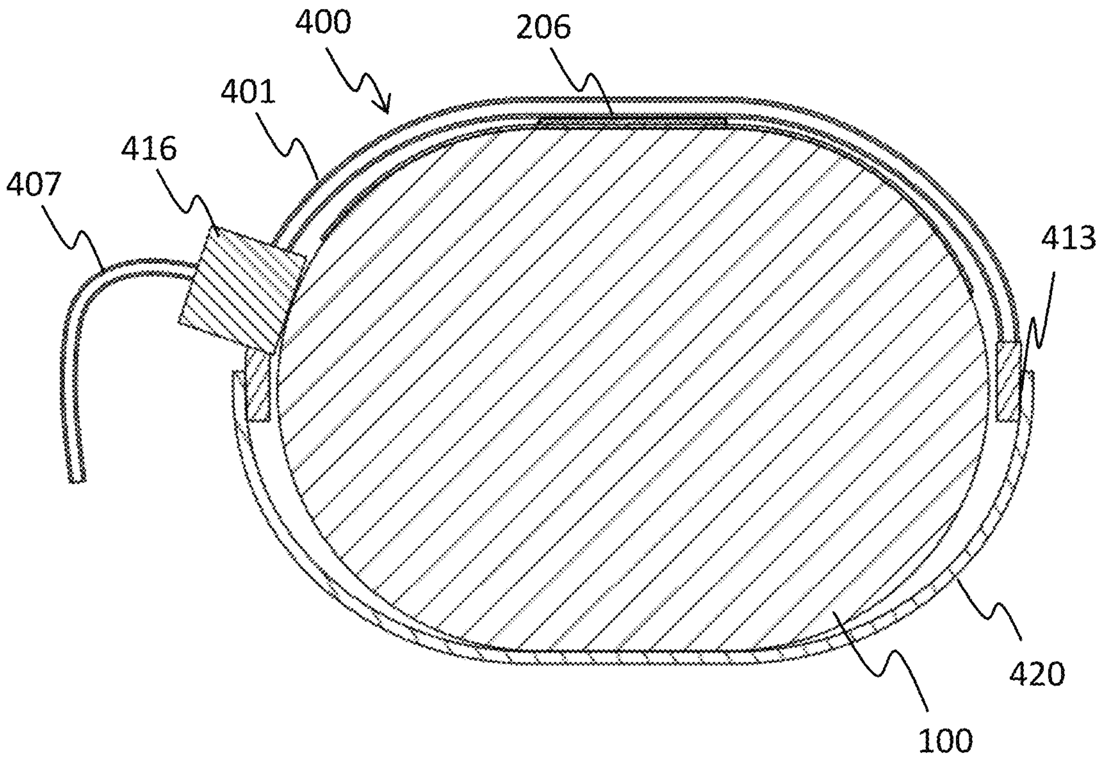
FIG. 6C is a cross-sectional view of a distension device having a restraining strap attached to a subject according to one embodiment.

FIG. 6B depicts an exemplary distension device 300 secured to the body 100 similarly to that of FIG. 6A. The tube 301 is connected to a connection element 309 housing a port that communicates air between the air supply 307 and the tube 301. Since various length of the device 300 tubing would be desirable depending on the characteristics of the patient and the condition being treated, a clamp 302 (shown open) can be included so that the distal end of the device is clamped off where desired. The clamp can be integrated onto the anchor as depicted. FIG. 6C depicts an exemplary distension device 400 secured to a body by way of a restraining strap 420. The tube 401 is connected to a connection element 416 housing a port that communicates air between the air supply 407 and the tube 401. The restraining strap 420 connects to the connection element 416 and the closed end 413 of the tube 401. The restraining strap 420 can be connected in any suitable manner as would be understood by a person skilled in the art, including, but not limited to a snap button, clip, buckle, and the like. The restraining strap 420 is positioned on a patient such that when the patient is lying in a supine position, the restraining strap 420 is held between the patient's back and the structure underneath.

Figure 6D:
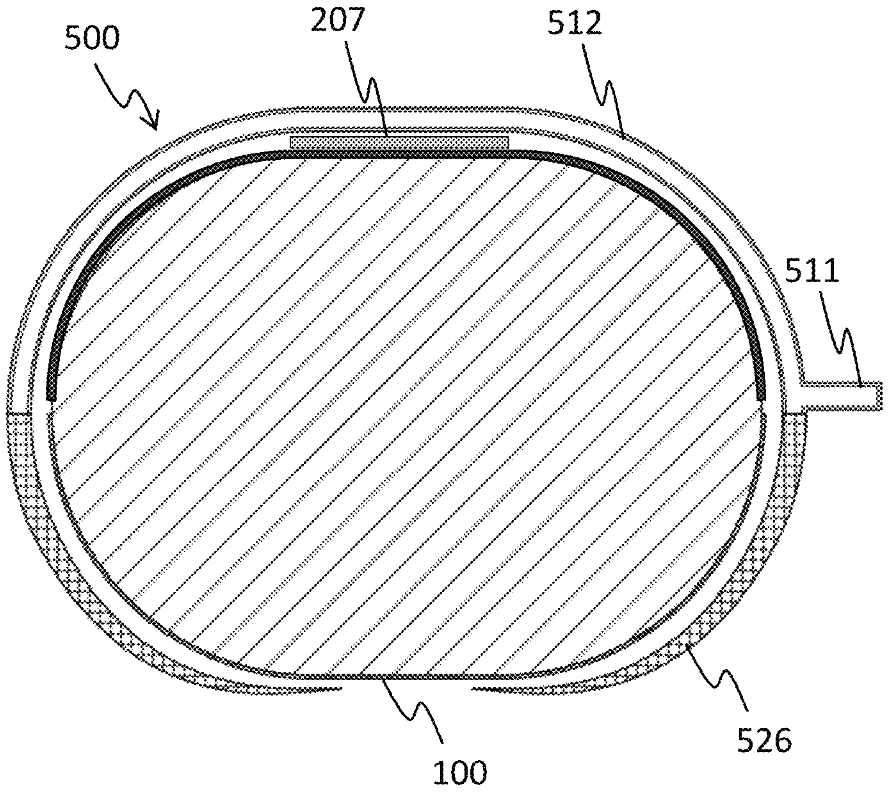
FIG. 6D is a cross-sectional view of a distension device having a tapered tube extension according to one embodiment.

FIG. 6D depicts an exemplary distension device 500 secured to a body by way of tube extensions 526. The tube extensions 526 are extensions of the at least one tube 512. The tube 512 is connected to a connection element 509 having a port that communicates air between an air supply and the tube 501. In certain embodiments, the tube extension 526 is a solid material that is non-inflatable. In certain embodiments, the tube extensions 526 overlap and attach to each other to help secure the distension device. The tapered tube extensions 526 may also serve as a connector port for the inflating air. In certain embodiments, the non-inflatable portion is used for anchoring to the postero lateral aspects of the chest wall. In certain embodiments, the Velcro under the non-inflatable portions is continuous and will not permit elongation—just anchoring. In certain embodiments the silicone adhesive will permit some stretching as needed by the patient when the patient takes a deep breath. In contrast, the Velcro under the inflatable portion of the tube is cut in a zig-zag or Z-shaped configuration to permit stretching in response to the tube as it elongates. The silicone adhesive under the inflatable portion of the tube (tube assembly) allows stretching of the tube assembly Another embodiment includes an air inlet port included in a silicone connector that also serves to allow attachment of the tubes, and provides a fixed connection to the chest wall. One of these connectors can be included at both ends so that the tube could be trimmed to custom fit. In certain embodiments, the connectors would have a mechanism (see for example the connector of FIG. 6B) for clamping both ends of the tube in a way that was airtight and resistant to the pressure build up within the tube.

Figure 7A:
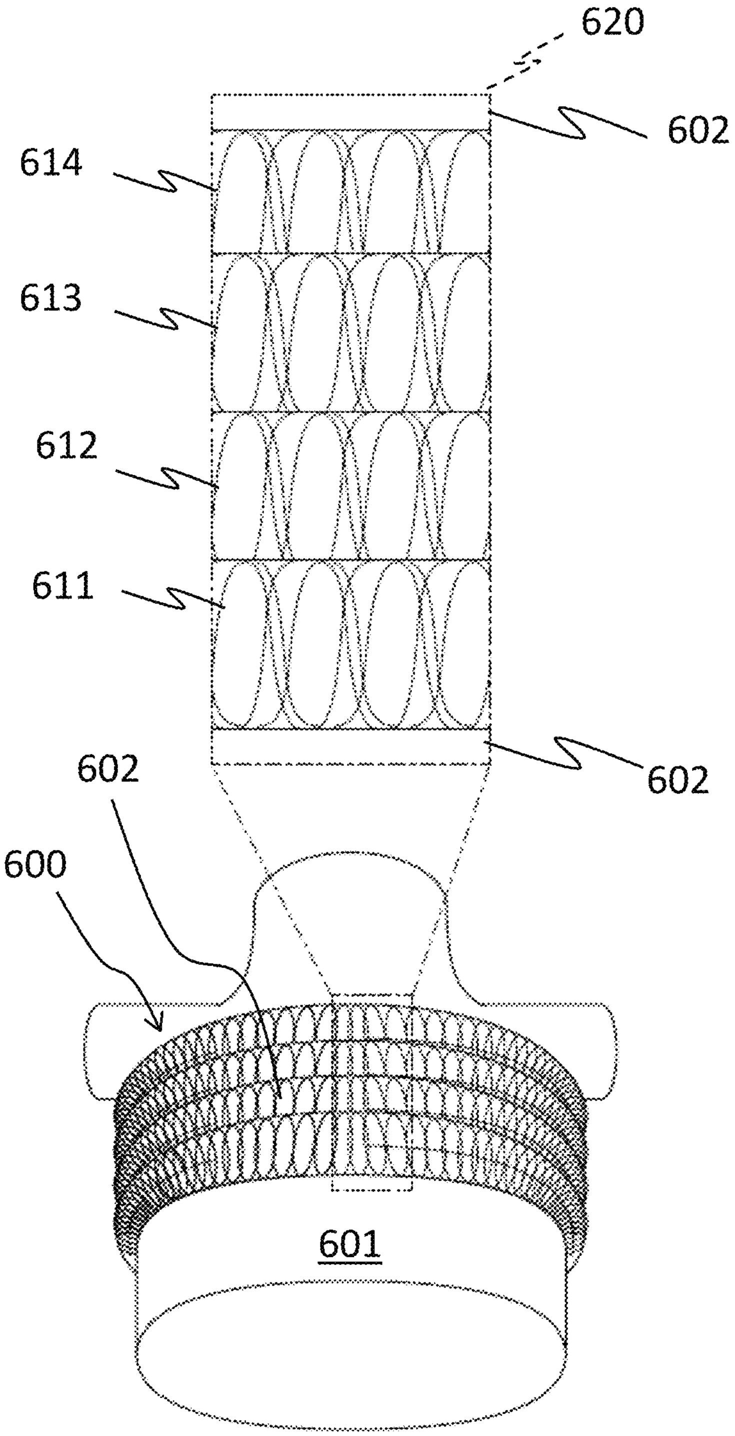
FIG. 7A is a perspective and magnified partial cutaway view (620) of a chest expander having multiple tubes embedded in silicone according to one embodiment.

With reference now to FIG. 7A, a chest expander 600 is shown according to one embodiment as having four longitudinally expandable tubes 611, 612, 613, 614 embedded in silicone 602 (as shown in magnified partial cutaway view 620), which advantageously increases the surface area contact with the patient. The silicone 602 should be sufficiently elastic and flexible so that it can assume the shape of the patient's chest or abdomen, and also mirror the expansion described herein for the longitudinally expandable tubes 611, 612, 613, 614. In certain embodiments, the tubes are only partially embedded into the silicone. In certain embodiments, silicone is added to gaps between the tubes for connecting the tubes and increasing surface area contact with the patient. In certain embodiment, the tubes are configured to expand at different rates or to different distances depending on the preferred expansion profile of the device, the characteristics of the patient, and the type of treatment being administered. This can be accomplished for example by varying individual tube characteristics, varying the pressurizing medium, and/or varying the amount of pressure delivered to individual tubes.

Figure 7B:
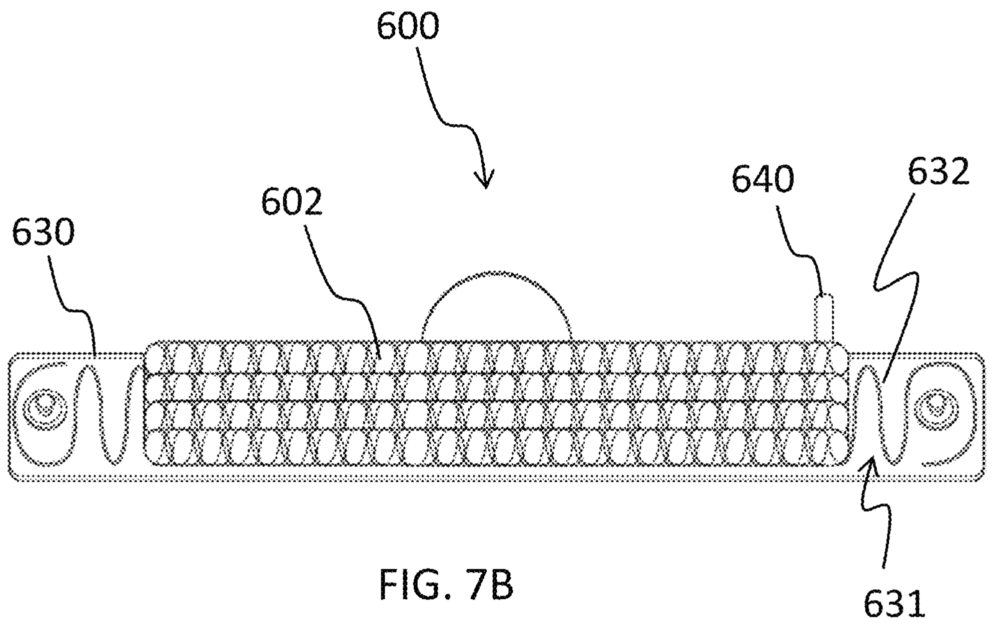
FIG. 7B is a perspective view of a chest expander having multiple tubes embedded in silicone according to one embodiment.
Figure 7C:
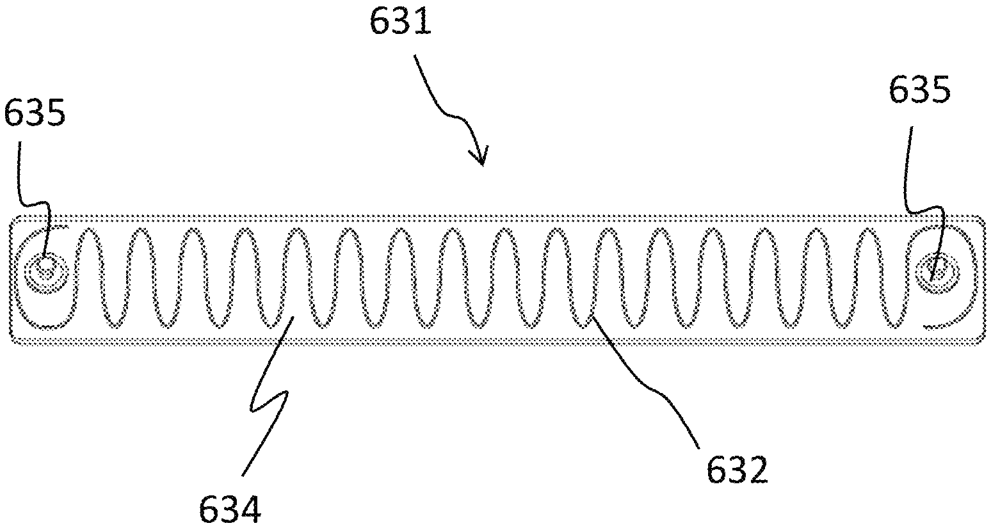
FIG. 7C is a top view of a silicone plethysmography sensor according to one embodiment.
Figure 7D:
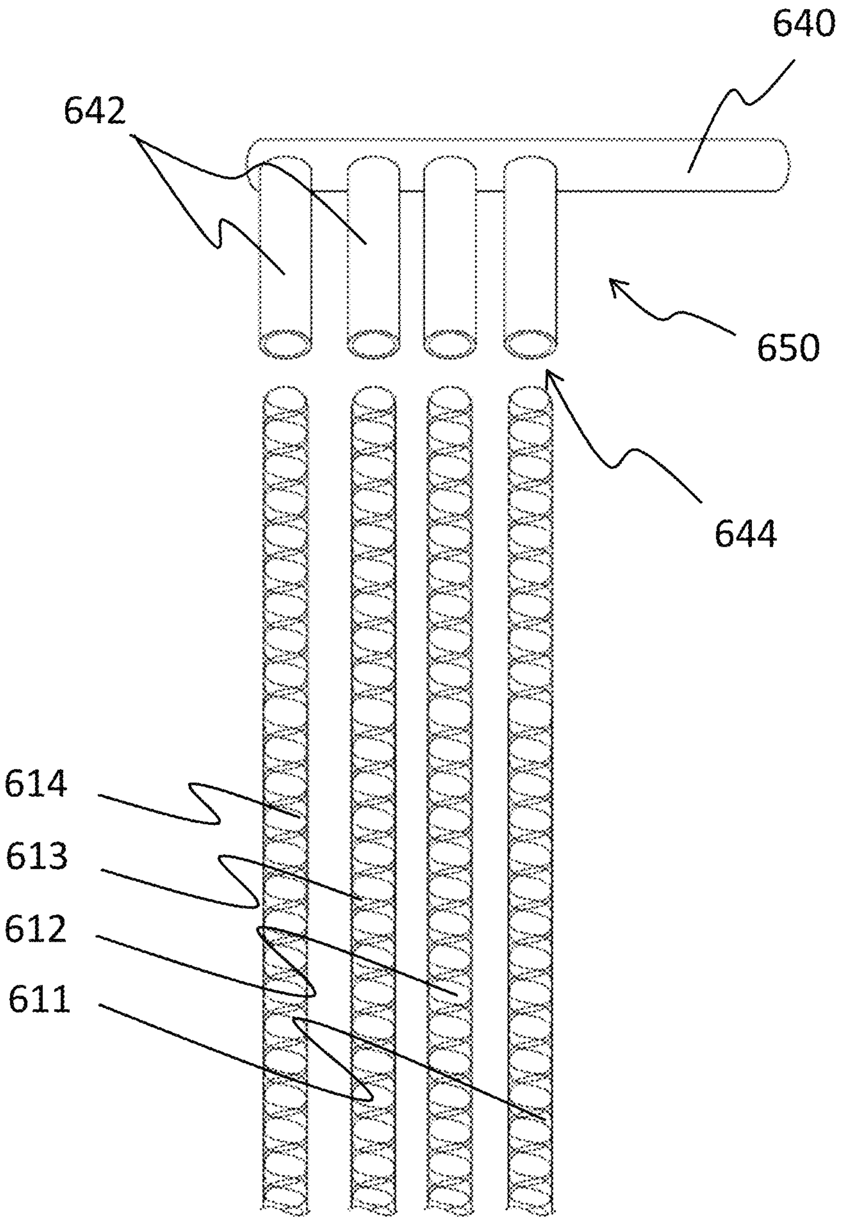
FIG. 7D is an exploded view of the connection element and corresponding tubes according to one embodiment.
Figure 7E:
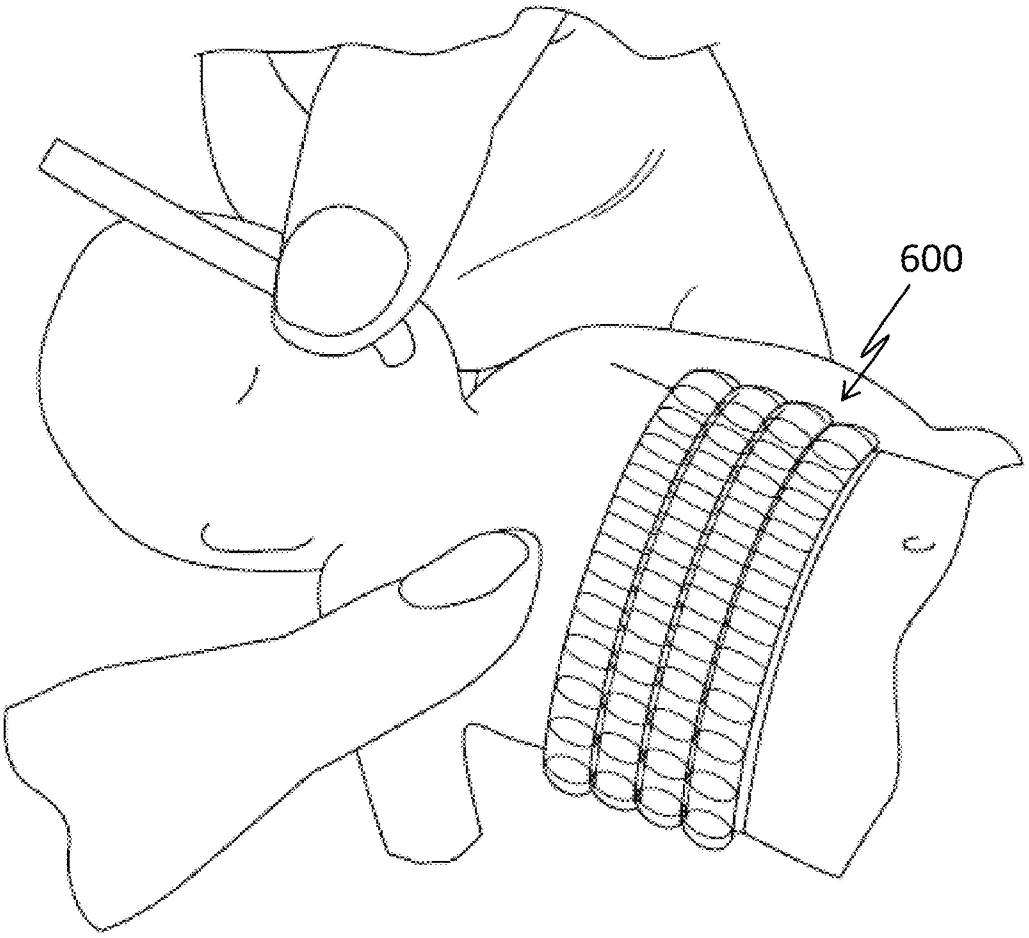
FIG. 7E is a perspective view of a chest expander on a patient according to one embodiment.
Figure 7F:
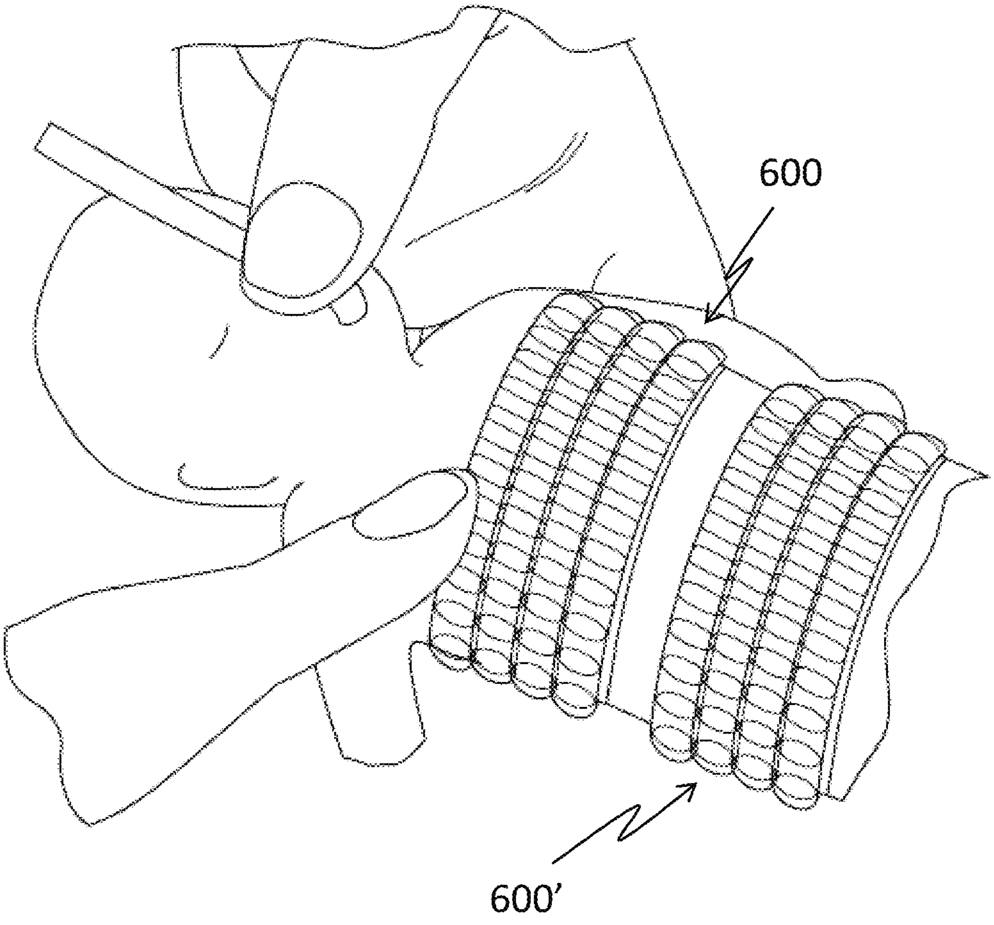
FIG. 7F is a perspective view of a chest expander and an abdomen expander on a patient according to one embodiment.

With reference now to FIGS. 7B and 7C, in one embodiment the chest expander 600 can have a layer including a silicone plethysmography sensor 631, including a sinusoidal wire 632 embedded in in the silicone with snap connectors 635 at either end. The under surface of the silicone plethysmography sensor 631 can be covered with a silicone adhesive strip 630 or backing having a release liner, such as a peel-and-stick adhesive backing. The silicone skin adhesive can also be provided in liquid form and may be directly applied to the patient side of the Chest expander 600 and then cured. The sinusoidal wire 632 in certain embodiments is partially or fully embedded in a silicone layer 634. The sensor 631 can be used to measure how the chest and/or abdomen moves with breathing. It expands on inspiration and is an example of a sensor that can be used to generate a feedback signal for controlling and automatically adjusting the output of the pump. The sensor 631 can be integral to the chest expander 600, or positioned separately (see e.g. sensor 804 in FIG. 10A). The sensor or adhesive strip can have additional connectors 635 such as velcro, snap, adhesive or button connectors for connecting ends of the strip together. As shown in FIG. 7D, components of the chest expander include a connection element 650 that in one embodiment includes a primary air conduit 640 for connection to an air supply, and branched connections 642 that receive air from the primary air conduit 640 and connect to the longitudinally expandable tubes 611, 612, 613, 614. The connection element 650 can include one or more valves such as pressure actuated or controller actuated valves for simulataneously or individually controlling air flow to one or more tubes. The branched connections can also be sized to selectively control air flow to individual tubes. The chest expander 600, like other embodiments, can be placed on the chest (FIG. 7E) with an additional expander 600' placed on the abdomen (FIG. 7F).

Figure 8A:
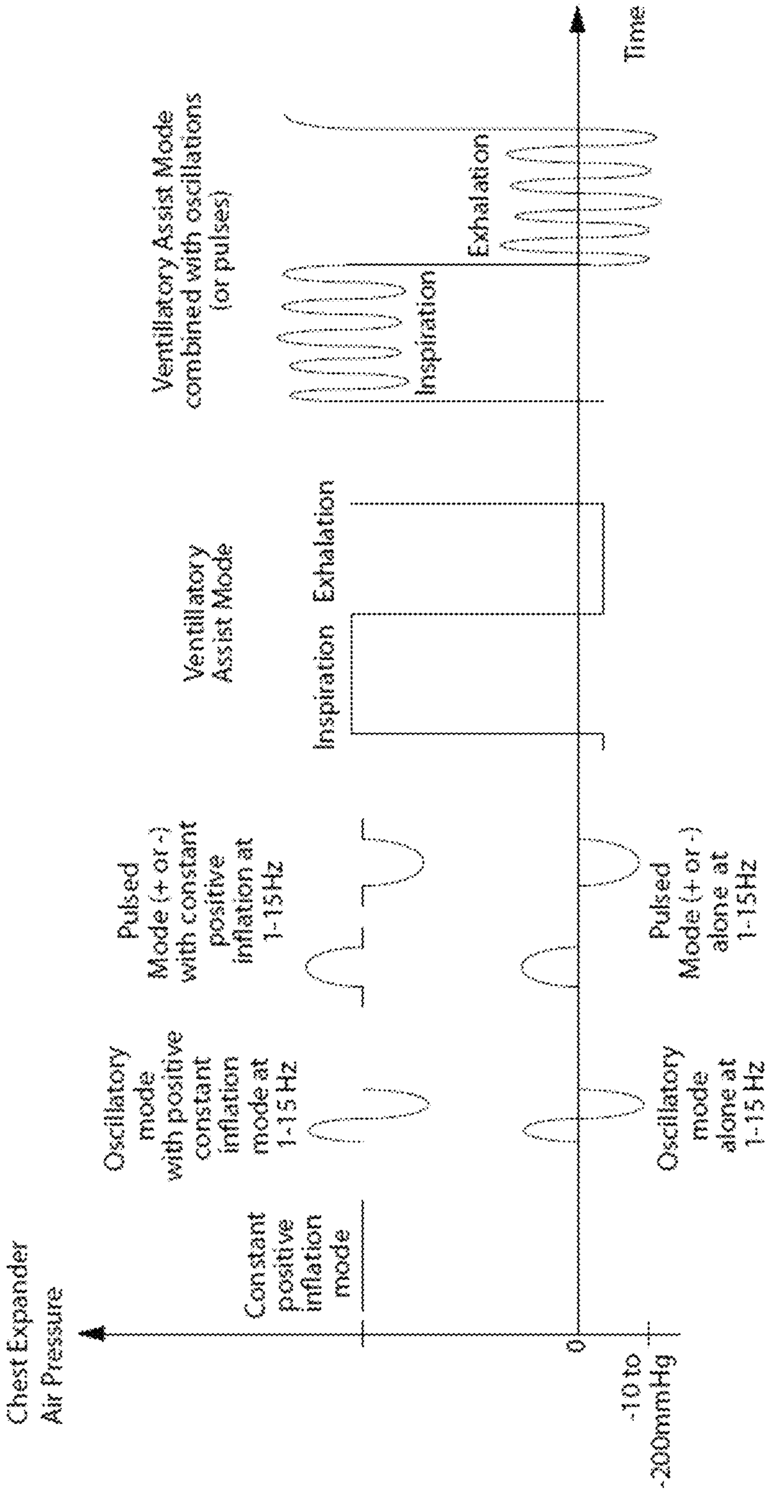
FIG. 8A is a graph of various inflation modes according to one embodiment.

With reference now to FIG. 8A, various oscillation modes are shown. In one embodiment, a constant positive inflation mode maintains a constant positive pressure. This acts to provide a constant distention to the chest wall. In one embodiment, an oscillatory mode oscillates at 1-15 Hz between two positive pressures or between a positive and a negative pressure or even just a negative pressure. Thus, embodiments described herein can cause the device to exert a negative distending pressure to the chest wall and a positive compressive pressure to the chest wall. In one embodiment, a pulsed mode pulses between two positive pressures (producing chest wall expansion) or a positive and a negative pressure exerted to the chest wall. In another embodiment a pulsed mode pulses a negative pressure into the tubes thereby causing a compressive pressure on the chest. In one embodiment, a ventilatory assist mode maintains a positive pressure into the tubes during inspiration and a negative pressure into the tubes during exhalation. This distends the chest wall during inspiration, and relaxes it during exhalation. This mode can be synchronized with the patient's normal ventilation, or applied as a fixed ventilatory rate in the case of apnea. The inflation and deflation can alternate at about 1 to 15 Hz in some embodiments. In certain embodiments, the absolute value of pressure in the tubes at inspiration is much higher than the absolute value of pressure at exhalation. In one embodiment, a ventilatory assist mode combines with oscillations or pulses, oscillating around two positive pressures for inspiration and oscillating between a positive and a negative pressure during exhalation. Oscillations or pulses in certain embodiments are between 1 and 15 Hz. High frequency oscillations promote gas mixing and the movement of fluid secretions in the chest. This mode can be applied as a standalone mode, or in combination with the constant inflation or ventilator modes. Setting can be adjusted based on the patient, and one embodiment of guidelines for respiratory rates is provided in the table shown in FIG. 8B. These are normal respiratory rates. High frequency ventilation will require higher rates (1-15 Hz) that produce smaller volumes than usual tidal volumes. Exemplary modes of device inflation/deflation are summarized in the chart shown in FIG. 8C.

The degree of outward pull provided by the device can be adjusted based on the amount of air in the tube. For example, the distending pressure in the tube can be controlled by increasing the amount of air added to the tube, or by removing air from the tube. This allows the operation of the device to be fine-tuned, allowing for relatively small, and thus safe, adjustments of negative distending pressure on the patient's chest. In various embodiments, a clinician can adjust the pressure into the tube using a pressure controller so as to obtain only slight chest movement and prevent over-distension of the lung. In one embodiment, the operation of the device can be fine-tuned by using a ventilation device useful for measuring air pressure, such as a NEOPUFF device. When using the NEOPUFF device, a clinician can adjust the amount of continuous airway pressure delivered to the tube instead of to a face mask or endotracheal tube. In another embodiment, the operation of the device can be controlled by using a syringe with volume indicators. In one such embodiment, the tube can be optimally inflated with a syringe or a self-inflating bag with a one way valve. In another embodiment, the tube can be inflated using airflow with pressure regulated by a connection to a tube submerged under water so the pressure delivered to the tube would bubble at the set height of the water column. This method of inflating the tubes can provide negative distending pressure as well as chest wall oscillations produced by the bubbles. In such an embodiment, the height of the water column can regulate the amount of inflation. In addition, the inflation of the tube can be synchronized with spontaneous breathing by the patient, as detected by abdominal movement, or mechanical or electrical detection of diaphragmatic movement, i.e., NAVA ventilation. Other sensors may include for example thoracic impedance sensors and chest wall accelerometers. In one embodiment, the device of the present invention can be used in conjunction with a MAQUET SERVO-i ventilator and make use of the NAVA catheter that senses the electrical activity of the diaphragm. In one embodiment, the abdominal movement is detected by one or more sensors positioned on the device. In one embodiment, the device is used with or integrated into a respirator. In another embodiment the device can be used to embed sensors for monitoring physiological changes that include, chest motion, EKG, and respiratory and cardiac sounds.

Figure 9:
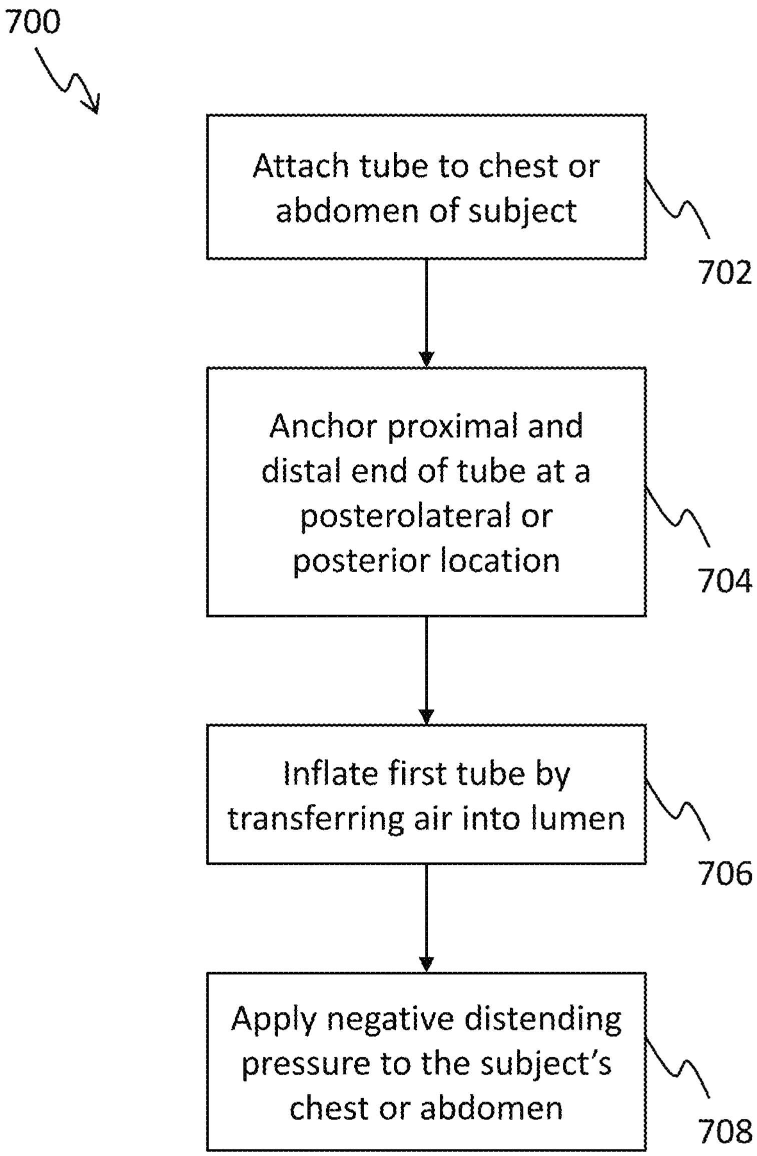
FIG. 9 is a flow chart of a method for assisting breathing according to one embodiment.

A method 700 for assisting a patient's breathing is also disclosed, with reference now to FIG. 9. In one embodiment, the method includes the steps of attaching a first flexible and elastic tube having a first lumen to the chest or abdomen of a subject 702, anchoring a proximal and distal end of the at least first tube to a first and second posterolateral or posterior region of the subject 704, inflating the at least first tube by transferring air into first lumen 706, and applying a negative distending pressure to the subject's chest or abdomen via the inflating 708. In one embodiment, the at least first tube is at least partially deflated to reduce the negative distending pressure applied to the subject's chest or abdomen. In one embodiment, the at least first tube is attached to the subject's chest or abdomen by a skin attachment mechanism. In one embodiment, the skin attachment mechanism is a hydrogel. In one embodiment, the skin attachment mechanism is a hydrocolloid. In one embodiment, the skin attachment mechanism is a semi-permeable membrane dressing. In one embodiment, the at least first tube is in continuous contact with the subject's chest or abdomen. In one embodiment, the method includes transferring air into the first lumen via a syringe or a bulb syringe. In one embodiment, the method includes transferring air into the compartment via a ventilator or an air pump. In one embodiment, the method includes transferring a predetermined amount of air into the compartment to inflate the at least one first tube. In one embodiment, the predetermined amount of air corresponds to an application of negative distending pressure to the subject's chest or abdomen that causes the subject to inhale a breath approximately equal to or less than the tidal volume. In one embodiment, the inflation of the at least one tube is synchronized with the spontaneous inspiration of the subject. In one embodiment, the negative distending pressure applied to the subject's chest or abdomen is statically maintained for a predetermined period of time. In one embodiment, the method includes deflating the at least one tube to release the negative distending pressure. In one embodiment, the inflating or deflating of the at least one tube is controlled based on sensor feedback of the subject's diaphragm. In one embodiment, the operation of the at least one tube is based on sensor feedback. In one embodiment, the step of applying a negative distending pressure includes high frequency oscillations. In one embodiment, vacuum pressure is applied to the tube to generate a positive compressive force on the patient.

Experimental Examples

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Depending on the operation mode, the clinician can use various techniques to determine how much pressure to apply to the device. In static pressure mode, if the pressure is being added to provide a relatively constant negative distending pressure to the lung, the clinician will inflate the chest expander sufficiently to notice a slight (approx. 2-3 mm) increase in chest diameter. The pressure used to inflate the expander will be held constant. This will be accompanied by clinical signs of reduced spontaneous breathing effort i.e. reduced respiratory rate, reduced abdominal excursion, reduced nasal flaring, and reduced retractions. If there is a transcutaneous monitor there might be a confirmatory reduction in elevations of carbon dioxide. The need for supplemental oxygen will also be less as the volume of the lung expands. Over distension of the device will cause an increase of respiratory distress. In high frequency oscillation mode, the expander will be inflated to produce a visible expansion of the chest and a reduction in the need for supplemental oxygen. Oscillatory pressure amplitude will be gradually added to the background inflating pressure in the expander so that a gentle vibration of the chest wall is discernable. The frequency and amplitude will be adjusted according to blood gases. In synchronized to respiratory effort mode, the expander will be inflated in synchrony with the patients effort to breathe, i.e. pressure will be added to the expander at the onset of inspiration when the airway opens. The pressure will be adjusted to reduce clinical signs of respiratory distress and show slight expansion of the chest.

Figure 10A:
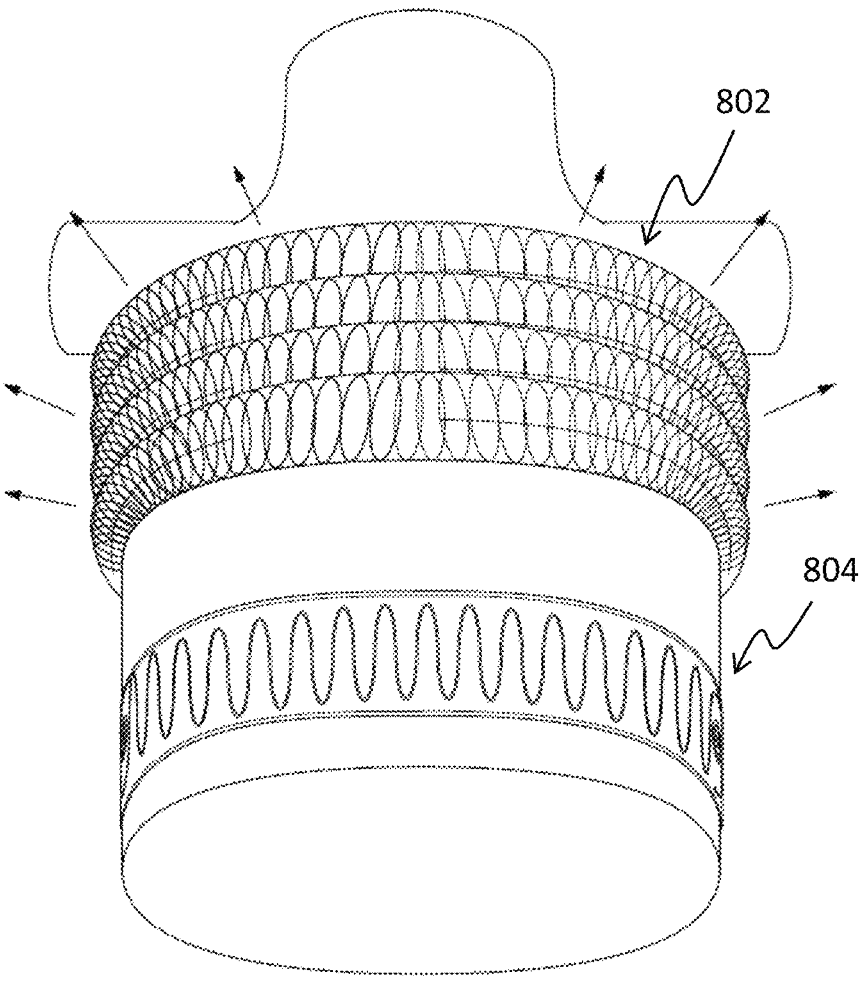
FIG. 10A is a diagram of an experimental setup of a chest expander placed on a mannequin according to one embodiment.
Figures 10B, 10C:
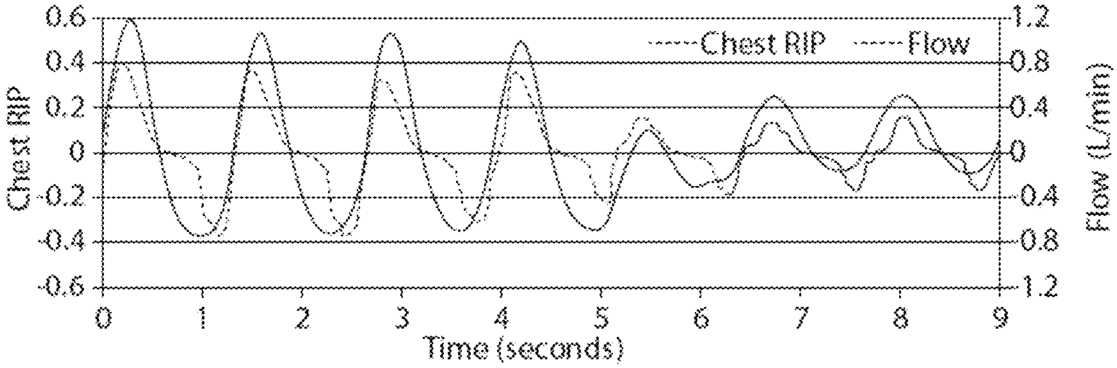
FIGS. 10B and 10C are a graph and chart respectively of movement, flow and pressure data acquired from the experimentation.

With reference now to FIGS. 10A and 10B, the mannequin setup was used to measure the pressure required to inflate the chest expander and the volume displaced from within the chest cavity. The mannequin represents the size of a 1.5 kg newborn. Chest compression was produced by applying a vacuum to the chest expander. The chest expander consists of silicone tubes (four in this version) embedded in medical grade silicone foam and coated on the skin side with an FDA-approved silicone adhesive for direct application to the skin of the chest wall. The adhesive allows for non-traumatic, repeated removal and reapplication. Inflation of the distending tubes produces an expansion of the chest cavity and the inflow of air as the lungs expand. See short arrows in FIG. 10A. Exhalation was generated by passive recoil. A plethysmography sensor wire is also embedded into the silicone of the chest expander 802 for measuring chest wall motion. When inflated, the tubes elongate and do not widen since they are reinforced with kevlar thread. An abdominal RIP sensor 804 embedded in transparent silicone is also seen on this mannequin. The inflated tube moves the chest outwards and upwards. Data obtained from the mannequin is shown in FIGS. 10B and 10C. A respiratory inductance plethysmography (RIP) signal moves positively (arrow) when the chest expander is inflated showing it increases the chest circumference. Flow into the mannequin coincides with the chest wall expansion in response to the negative pressure generated. The inflating pressure into the expander was varied to produce an average tidal volume of 3.7 ml in the first 4 breaths and 1.7 ml in the next 3. (ref: normal TV is 7 ml for a 1.5 kg infant). These volumes are more than enough for high frequency oscillation.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A method for expanding and compressing a region of a subject comprising the steps of:

attaching a first flexible and elastic tube having a first lumen to the region of the subject via an adhesive layer applied along a length of the first flexible and elastic tube, the adhesive layer disposed below a portion of the first flexible and elastic tube that is configured to inflate, the adhesive layer configured to directly contact skin of the subject, wherein the flexible and elastic tube comprises a material that forms the first lumen extending from a proximal end to a distal end of the flexible and elastic tube, wherein longitudinal expansion of the flexible and elastic tube is less restricted than radial expansion of the flexible and elastic tube, and wherein the distal end of the first lumen is closed;

applying a positive intraluminal pressure within the first lumen to cause the first flexible and elastic tube to expand longitudinally and distend the region of the subject while expanding a volume of the region; and applying a negative intraluminal pressure within the first lumen to cause the first flexible and elastic tube to shrink longitudinally and compress the region of the subject.

2. The method of claim 1, wherein at least one of the applying a positive intraluminal pressure and applying a negative intraluminal pressure is based on sensor feedback.

3. The method of claim 2, wherein the sensor feedback is measured from the region.

4. The method of claim 2, wherein the sensor feedback is a signal indicative of at least one of heart rate, respiratory effort, chest displacement and tube function.

5. The method of claim 2, wherein a sensor is connected to the first flexible and elastic tube.

6. The method of claim 2, wherein a sensor is at least partially embedded within a portion of the first flexible and elastic tube.

7. The method of claim 1 further comprising:

holding a predetermined positive intraluminal pressure for a predetermined amount of time.

8. The method of claim 7, wherein the predetermined positive intraluminal pressure is determined based on sensor feedback.

9. The method of claim 7, wherein the predetermined amount of time is based on sensor feedback.

10. The method of claim 7, wherein the predetermined positive intraluminal pressure is less than full positive intraluminal pressure.

11. The method of claim 1 further comprising:

holding a predetermined negative intraluminal pressure for a predetermined amount of time.

12. The method of claim 11, wherein the predetermined negative intraluminal pressure is determined based on sensor feedback.

13. The method of claim 11, wherein the predetermined amount of time is based on sensor feedback.

14. The method of claim 1 further comprising:

attaching the first flexible and elastic tube to the region of the subject by applying a skin attachment mechanism.

15. The method of claim 1, wherein the step of applying a negative intraluminal pressure comprises oscillations of at least 1 Hz.

16. The method of claim 1, wherein the step of applying a positive intraluminal pressure comprises oscillations of at least 1 Hz.

17. The method of claim 1 further comprising:

oscillating between first and second positive intraluminal pressures.

18. The method of claim 1 further comprising:

oscillating between first and second negative intraluminal pressures.

19. The method of claim 1 further comprising:

oscillating between the positive intraluminal pressure and the negative intraluminal pressure.

* * * * *